(12) United States Patent
Li et al.

(10) Patent No.: US 11,345,534 B2
(45) Date of Patent: *May 31, 2022

(54) OXYGEN SCAVENGING COMPOSITIONS, ARTICLES CONTAINING SAME, AND METHODS OF THEIR USE

(71) Applicant: Plastipak Packaging, Inc., Plymouth, MI (US)

(72) Inventors: Shenshen Li, Park Ridge, IL (US); Matthew J. Dauzvardis, Manhattan, IL (US); Richard L. Hoch, New Lenox, IL (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,798

(22) Filed: Nov. 25, 2019

(65) Prior Publication Data

US 2020/0165051 A1 May 28, 2020

Related U.S. Application Data

(63) Continuation of application No. 14/466,717, filed on Aug. 22, 2014.

(51) Int. Cl.
| | |
|---|---|
| B65D 81/26 | (2006.01) |
| C08K 5/098 | (2006.01) |
| C08K 5/20 | (2006.01) |
| C08K 5/3417 | (2006.01) |
| C08J 3/22 | (2006.01) |
| B29K 77/00 | (2006.01) |

(52) U.S. Cl.
CPC ............ B65D 81/266 (2013.01); C08K 5/098 (2013.01); C08K 5/20 (2013.01); C08K 5/3417 (2013.01); *B29K 2077/00* (2013.01); *C08J 3/22* (2013.01); *C08J 3/223* (2013.01); *C08K 2201/012* (2013.01)

(58) Field of Classification Search
CPC .. B65D 81/266; B65D 81/267; B65D 81/268; C08K 5/098; C08K 5/20; C08K 5/3417; C08K 2201/012; C08J 3/22; C08J 3/223; B29K 2077/00
USPC .................................................. 252/188.28
See application file for complete search history.

(56) References Cited

U.S. PATENT DOCUMENTS

| | | | |
|---|---|---|---|
| 2,841,591 A | 7/1958 | Prichard | |
| 3,322,785 A | 5/1967 | Henry | |
| 4,154,622 A | 5/1979 | Momoi et al. | |
| 4,536,409 A | 8/1985 | Farrell et al. | |
| 4,769,444 A | 9/1988 | Joswig et al. | |
| 4,786,671 A | 11/1988 | Kress et al. | |
| 5,021,515 A | 6/1991 | Cochran et al. | |
| 5,034,252 A | 7/1991 | Nilsson et al. | |
| 5,049,624 A | 9/1991 | Adams et al. | |
| 5,075,362 A | 12/1991 | Hofeldt et al. | |
| 5,116,547 A | 5/1992 | Tsukahara et al. | |
| 5,159,005 A | 10/1992 | Frandsen et al. | |
| 5,194,478 A * | 3/1993 | Frandsen | B65D 81/268 524/398 |
| 5,211,875 A * | 5/1993 | Speer | B32B 27/306 252/188.28 |
| 5,239,016 A | 8/1993 | Cochran et al. | |
| 5,250,592 A | 10/1993 | Nesvadba | |
| 5,281,360 A | 1/1994 | Hong et al. | |
| 5,639,815 A | 6/1997 | Cochran et al. | |
| 5,660,761 A | 8/1997 | Katsumoto et al. | |
| 5,866,649 A | 2/1999 | Hong et al. | |
| 5,955,527 A | 9/1999 | Cochran et al. | |
| 6,057,013 A | 5/2000 | Ching et al. | |
| 6,083,585 A | 7/2000 | Cahill et al. | |
| 6,261,749 B1 | 7/2001 | Asami | |
| 6,288,161 B1 | 9/2001 | Kim et al. | |
| 6,610,234 B2 | 8/2003 | Akkapeddi et al. | |
| 6,664,320 B1 | 12/2003 | Cai et al. | |
| 6,780,916 B2 | 8/2004 | Tung et al. | |
| 7,052,628 B2 | 5/2006 | Schmidt et al. | |
| 7,097,890 B1 | 8/2006 | Ching et al. | |
| 7,691,290 B2 * | 4/2010 | Deshpande | C06B 23/00 252/188.28 |
| 7,879,930 B2 | 2/2011 | Liu | |
| 7,884,245 B2 | 2/2011 | Takaso et al. | |
| 7,994,245 B2 | 8/2011 | Deshpande et al. | |
| 8,431,721 B2 | 4/2013 | Deshpande et al. | |
| 8,450,398 B2 | 5/2013 | Deshpande | |
| 8,721,920 B2 | 5/2014 | Deshpande et al. | |
| 8,748,519 B2 | 6/2014 | Deshpande | |

(Continued)

FOREIGN PATENT DOCUMENTS

| | | |
|---|---|---|
| AU | 2008251476 A1 | 11/2008 |
| BR | 8807141 | 10/1989 |

(Continued)

OTHER PUBLICATIONS

U.S. Appl. No. 60/928,553, filed May 10, 2007, Girish Nilkanth.
U.S. Appl. No. 12/117,849 (US-2008-0277622 A1/U.S. Pat. No. 7,994,245), filed May 9, 2008 (Nov. 13, 2008; Aug. 8, 2011), Girish Nilkanth.
U.S. Appl. No. 13/164,477 (US-2011-0251395-A1/U.S. Pat. No. 8,431,721), filed Jun. 20, 2011 (Oct. 13, 2011; Apr. 30, 2013), Girish Nilkanth.
U.S. Appl. No. 13/849,797 (US-2014-0027339-A1/U.S. Pat. No. 9,475,630), filed Mar. 25, 2013 (Jan. 30, 2014; Oct. 25, 2016), Girish Nilkanth.

(Continued)

*Primary Examiner* — Matthew R Diaz
(74) *Attorney, Agent, or Firm* — Ballard Spahr LLP

(57) ABSTRACT

The disclosure relates to oxygen scavenging compositions, methods of making the compositions, articles prepared from the compositions, and methods of making the articles. This abstract is intended as a scanning tool for purposes of searching in the particular art and is not intended to be limiting of the present invention.

12 Claims, 5 Drawing Sheets

(56) References Cited

U.S. PATENT DOCUMENTS

| | | | |
|---|---|---|---|
| 8,975,345 | B2 | 3/2015 | Deshpande |
| 9,181,414 | B2 | 11/2015 | Deshpande |
| 9,475,630 | B2 | 10/2016 | Deshpande et al. |
| 2001/0008662 | A1 | 7/2001 | Blinka et al. |
| 2003/0109643 | A1 | 6/2003 | Ching et al. |
| 2003/0134966 | A1 | 7/2003 | Kim et al. |
| 2004/0219320 | A1 | 11/2004 | Cochran et al. |
| 2004/0241468 | A1 | 12/2004 | Otaki |
| 2005/0073272 | A1 | 4/2005 | Nagashima et al. |
| 2005/0106343 | A1 | 5/2005 | Kim et al. |
| 2006/0069197 | A1 | 3/2006 | Tammaji et al. |
| 2006/0128861 | A1 | 6/2006 | Stewart et al. |
| 2006/0148957 | A1 | 7/2006 | Stewart et al. |
| 2006/0180790 | A1 | 8/2006 | Deshpande et al. |
| 2006/0182911 | A1 | 8/2006 | Tammaji et al. |
| 2006/0247388 | A1 | 11/2006 | Hale et al. |
| 2007/0066731 | A1 | 3/2007 | Tattum et al. |
| 2007/0241309 | A1 | 10/2007 | Uradnisheck |
| 2008/0161472 | A1 | 7/2008 | Jenkins et al. |
| 2008/0241521 | A1 | 10/2008 | Solovyov et al. |
| 2008/0255280 | A1 | 10/2008 | Sims et al. |
| 2008/0277622 | A1 | 11/2008 | Deshpande et al. |
| 2009/0030115 | A1 | 1/2009 | Liu |
| 2009/0062297 | A1 | 3/2009 | Heidebrecht et al. |
| 2009/0278087 | A1 | 11/2009 | Deshpande et al. |
| 2010/0154361 | A1 | 6/2010 | Deshpande et al. |
| 2011/0117301 | A1 | 5/2011 | Desphande |
| 2011/0123741 | A1 | 5/2011 | Deshpande |
| 2011/0171405 | A1 | 7/2011 | Deshpande |
| 2011/0172335 | A1 | 7/2011 | Desphande |
| 2011/0251395 | A1 | 10/2011 | Deshpande et al. |
| 2011/0259778 | A1 | 10/2011 | Share et al. |
| 2011/0275750 | A1 | 11/2011 | Bene et al. |
| 2012/0012784 | A1 | 1/2012 | Share et al. |
| 2012/0095144 | A1 | 4/2012 | Roelofs et al. |
| 2012/0175555 | A1 | 7/2012 | Menozzi et al. |
| 2012/0199515 | A1 | 8/2012 | Peters et al. |
| 2012/0283366 | A1 | 11/2012 | Akkapeddi et al. |
| 2013/0158182 | A1 | 6/2013 | Menozzi et al. |
| 2013/0285277 | A1 | 10/2013 | Behrendt et al. |
| 2014/0220281 | A1 | 8/2014 | Black et al. |

FOREIGN PATENT DOCUMENTS

| | | |
|---|---|---|
| BR | 8906385 | 8/1990 |
| BR | 9707824 | 7/1999 |
| CA | 1272341 A1 | 7/1990 |
| CA | 2247985 A1 | 9/1997 |
| CN | 101072820 A | 11/2007 |
| CN | 101193976 A | 6/2008 |
| CN | 101688020 A | 3/2010 |
| DE | 442774 C | 4/1927 |
| EP | 0144807 A2 | 6/1985 |
| EP | 0301719 A1 | 2/1989 |
| EP | 0335520 A1 | 10/1989 |
| EP | 0794053 A2 | 9/1997 |
| EP | 1442993 A1 | 8/2004 |
| EP | 1655238 A1 | 5/2006 |
| EP | 2483342 A2 | 8/2012 |
| GB | 1490671 A | 11/1977 |
| JP | S51-100143 | 9/1976 |
| JP | H01-026667 A | 1/1989 |
| JP | 1993-140555 | 8/1993 |
| JP | 1994-306360 | 1/1994 |
| JP | 2005008867 A | 1/2005 |
| JP | 2008523170 A | 7/2008 |
| RU | 2307846 C2 | 10/2007 |
| RU | 2406741 C2 | 12/2010 |
| RU | 2009145713 A | 6/2011 |
| WO | WO-1989/001012 A1 | 2/1989 |
| WO | WO-1995/02616 A2 | 1/1995 |
| WO | WO 2002/036670 A1 | 5/2002 |
| WO | WO-0236670 A1 * | 5/2002 ............. C08K 5/098 |
| WO | WO-2004/063247 A1 | 7/2004 |
| WO | WO-2005/023530 A1 | 3/2005 |
| WO | WO-2006/062816 A2 | 6/2006 |
| WO | WO-2006/088889 A2 | 8/2006 |
| WO | WO-2008/141185 A1 | 11/2008 |
| WO | WO-2009/152114 A1 | 12/2009 |
| WO | WO-2012/000614 A1 | 1/2012 |
| WO | WO-2013/165971 A1 | 11/2013 |
| WO | WO-2013/165971 A1 | 11/2013 |

OTHER PUBLICATIONS

U.S. Appl. No. 147/532 (US-2017-0088332-A1/U.S. Pat. No. 10,125,096), filed May 5, 2016 (Mar. 30, 2017/Nov. 13, 2018), Girish Nilkanth.
U.S. Appl. No. 16/189,363 (US- 2019-0315685-A1), filed Nov. 13, 2018 (Oct. 17, 2019), Girish Nilkanth.
U.S. Appl. No. 61/246,956, filed Sep. 29, 2009, Girish N. Deshpande.
U.S. Appl. No. 12/893,817 (US-2011-0123741-A1; U.S. Pat. No. 9,896,554), filed Sep. 29, 2010 (May 26, 2011; Feb. 20, 2018), Girish N. Deshpande.
U.S. Appl. No. 61/261,158, filed Nov. 13, 2009, Girish N. Deshpande.
U.S. Appl. No. 12/945,351 (US-2011-0172335-A1; U.S. Pat. No. 9,181,414), filed Nov. 12, 2010 (Nov. 10, 2015; Jul. 14, 2011), Girish N. Deshpande.
U.S. Appl. No. 14/935,953 (US-2016-0229988-A1; U.S. Pat. No. 10,040,922), filed Nov. 9, 2015 (Aug. 11, 2016; Aug. 7, 2018), Girish N. Deshpande.
U.S. Appl. No. 61/261,209, filed Nov. 13, 2009, Girish N. Deshpande.
U.S. Appl. No. 12/945,353 (US-2011-0171405-A1; U.S. Pat. No. 8,748,519), filed Nov. 12, 2010 (Jul. 14, 2011; Jun. 10, 2014), Girish N. Deshpande.
U.S. Appl. No. 14/258,823 (US-2014-0228524-A1; U.S. Pat. No. 8,975,345), filed Apr. 22, 2014 (Aug. 14, 2014; Mar. 10, 2015), Girish N. Deshpande.
U.S. Appl. No. 14/585,413 (US-2016-0376404-A1; U.S. Pat. No. 10,138,327), filed Dec. 30, 2014 (Dec. 29, 2016; Nov. 27, 2018), Girish N. Deshpande.
U.S. Appl. No. 61/261,219, filed Nov. 13, 2009, Girish N. Deshpande.
U.S. Appl. No. 12/945,355 (US-2011-0117301-A1; U.S. Pat. No. 8,450,398), filed Nov. 12, 2010 (May 19, 2011; May 28, 2013), Girish N. Deshpande.
U.S. Appl. No. 13/889,133 (US-2013-0266752-A1; U.S. Pat. No. 9,222,020), filed May 7, 2013 (Oct. 10, 2013; Dec. 29, 2015), Girish N. Deshpande.
U.S. Appl. No. 14/976,766 (US-2016-0311771-A1; U.S. Pat. No. 10,059,666), filed Dec. 21, 2015 (Oct. 27, 2016; Aug. 28, 2018), Girish N. Deshpande.
U.S. Appl. No. 16/114,737, filed Aug. 28, 2018, Girish N. Deshpande.
U.S. Appl. No. 61/640,168, filed Apr. 30, 2012, Kirk Behredt.
U.S. Appl. No. 13/873,918 (US-2013-0285277-A1), filed Apr. 30, 2012, Kirk Behrendt.
U.S. Appl. No. 14/466,608 (US-2014-0361218-A1), filed Aug. 22, 2014 (Dec. 11, 2014), Kirk Behrendt.
U.S. Appl. No. 60/652,888, filed Feb. 15, 2005, John Rost.
U.S. Appl. No. 11/354,661 (US-2006-080790-A1/U.S. Pat. No. 7,691,290), filed Feb. 15, 2006 (Aug. 17, 2006; Apr. 6, 2010), Girish Nilkanth.
U.S. Appl. No. 11,816,203 (US-2009-0278087-A1), filed Feb. 15, 2006 (Nov. 12, 2009), Girish Nilkanth.
U.S. Appl. No. 12/720,049 (US-2010-0154361-A1/U.S. Pat. No. 8,721,920), filed Mar. 9, 2010 (Jun. 24, 2010; May 13, 2014), Girish Nilkanth.
U.S. Appl. No. 14/466,717 (US-2016-0052694-A1), filed Aug. 22, 2014 (Feb. 25, 2016), Shenshen Li.
U.S. Appl. No. 14/517,643 (US-2016-0108207-A1; U.S. Pat. No. 10,351,692), filed Oct. 17, 2014 (Apr. 21, 2016; Jul. 16, 2019), Shenshen Li.
U.S. Appl. No. 16/508,282 (US-2020-0172702-A1), filed Jul. 10, 2018 (Jun. 4, 2020), Shenshen Li.
PCT/US2008/063250 (WO 2008/141185, May 9, 2008 (Nov. 20, 2008), Girish Nilkanth.
PCT/US2013/038801 (WO/2013/165971), Apr. 30, 2013 (Nov. 7, 2013), Kirk Behrendt.
PCT/US2006/005216 (WO2006/088889A2), Feb. 15, 2006 (Aug. 24, 2006), Girish Nilkanth.

(56) References Cited

OTHER PUBLICATIONS

PCT/US2015/046307 (WO2016/029120), Aug. 21, 2015 (Feb. 25, 2016), Shenshen Li.
Bandi, S. et al. (2005) "The mechanism of color generation in poly(ethylene terephthalate) / polyamide blends," *Polymer Degradation and Stability* 88: 341-348.
Böhme, H. et al. (1970) "Studies in phthalimidine series. 13. N-alpha halogenalkylcarboylic acid amides," *Pharmazie*, 25(5): 283-289.
Buhleier, E., et al. (1978) "2,6-Bis(aminomethyl)pyridine als Komplexligand und neues Kronenethersynthon," *Justus Liebigs Annalen der Chemie*, 4: 537-544. (Abstract).
Chen et al. (2007) "Efficient enhancement of DNA cleavage activity by introducing guanidinium groups into diiron(III) complex", *Bioorganic & Medicinal Chemistry Letters*, 18(1): 109-113.
De Almeida, M. V. et al. (2007) "Thalidomide Analogs from Diamines: Synthesis and Evaluation as Inhibitors of TNF-[alpha] Production," Chemical & Pharmaceutical Bulletin, 55(2): 223-226.
Devlieghere, F. et al. (2004) *International Dairy Journal*, 14: 273-285.
Grawe, T. et al. (2002) "Self-Assembly of Ball-Shaped Molecular Complexes in Water," *Journal of Organic Chemistry*, 67(11): 3755-3763.
Hara, S. et al. (1975) "Allylic Polymers, 1: Synthesis of Polyallyl Compounds Containing 4-Oxycarbonylphthalimido Units and Their Polymers," *Die Makromolekulare Chemie* 176(1): 127-141. (English Abstract).
Hu, Y.S. et al: Improving transparency of stretched PET/MXD6 blends by modifying PET with isophthalate, Polymer, Elsevier Science Publishers B.V, GB, vol. 46, No. 14, Jun. 27, 2005 (Jun. 27, 2005), pp. 5202-5210.
Keenan, R. M. et al. (1999) "Conformational Preferences in a Benzodiazepine Series of Potent Nonpeptide Fibrinogen Receptor Antagonists," *Journal of Medicinal Chemistry*, 42(4): 545-559.
Knollmuller, M. (1974) *Monatshefte Fur Chemie*, 105: 114-122. (English Abstract).
Kricheldorf, H. R. (1980) "15N NMR Spectroscopy: 28-Solvent Effects on the 15N-13C Coupling Constants of Amides, Imides, Ureas, and Polypeptides," *OMR Organic Magnetic Resonance*, Heyden & Son Ltd., GB, 14(6): 455-561.
PubChem Database Compound [Online citiation] NCBI; Sep. 7, 2005 (Sep. 7, 2005), Database accession No. CID 3317391, pp. 1.
Ragusa, A. et al. (2005) "Novel Enantioselective Receptors for N-Protected; Glutamate and Aspartate," *Chemistry—A European Journal*, 11(19): 5674-5688.
Rosevear, J., et al. (1990) "A Comparison of the Reactions of Some Ethyl N-Arylcarbamates with Those of the Corresponding Acetanilides. II Amidomethylation with N-Hydroxymethylphthalimide," *Austr. J. Chem.*, 43(2): 339-353.
Rossi, S. et al. (2002) "A Highly Enantioselective Receptor for N-Protected Glutamate and Anomalous Solvent-Dependent Binding Properties", *Angew. Chem. Int. Ed.* 41(22): 4233-4236.
Vacca, A. et al. (2004) "A New Tripodal Receptor for Molecular Recognition of Monosaccharides. A Paradigm for Assessing Glycoside Binding Affinities and Selectivities by 1H NMR Spectroscopy," *Journal of the American Chemical Society*, 126(50): 16456-16465.
Yoshito, T. et al. (1998) "Novel Self-Assembly of m-Xylylene Type Dithioureas by Head-to-Tail Hydrogen Bonding," *J. Org. Chem.*, 63: 7481-7489.
Zhan-Ting, L. et al. (1992) "The Synthesis of Fluorine-Containing Azamacrocyclic Compounds," *Heterocycles International Journal for Reviews and Communications in Heterocyclic Chemistry* 34(9): 1729-1736.
Response to Examination Report filed on May 20, 2014 for AU Pat. App. No. 2008251476, national phase of Intl. App. No. PCT/US2008/063250, filed May 9, 2008 (Inventor—G. Deshpande et al.; Applicant—Constar International, Inc.; pp. 1-17).
Examination Report dated Sep. 20, 2012 for AU Pat. App. No. 2008251476, national phase of Intl. App. No. PCT/US2008/063250, filed May 9, 2008 (Inventor—G. Deshpande et al.; Applicant—Constar International, Inc.; pp. 1-3).
Examination Report dated Feb. 5, 2015 for AU Pat. App. No. 2014224080, divisional of AU Pat. App. No. 2008251476, national phase of Intl. App. No. PCT/US2008/063250, filed May 9, 2008 (Inventor—G. Deshpande et al.; Applicant—Constar International, Inc.; pp. 1-3).
Australian Examination Report dated Dec. 1, 2016 by the Australian Patent Office for AU Application No. 2016203377, which was filed on May 4, 2016 and published as (Applicant—Plastipak Packaging, Inc.) (3 pages).
Office Action dated Apr. 1, 2015 for CA Pat. App. No. 2,687,081, national phase of Intl. App. No. PCT/US2008/063250, filed May 9, 2008 (Inventor—G. Deshpande et al.; Applicant—Constar International, Inc.; pp. 1-3).
Second Office Action dated Mar. 16, 2012 for CN Pat. App. No. 200880023116.X, national phase of Intl. App. No. PCT/US2008/063250, filed May 9, 2008 (Inventor—G. Deshpande et al.; Applicant—Constar International, Inc.; pp. 1-11).
Response to Office Action filed on Dec. 21, 2011 for CN Pat. App. No. 200880023116.X, which is national phase of Intl. App. No. PCT/US2008/063250, filed May 9, 2008 (Inventor—G. Deshpande et al.; Applicant—Constar International, Inc.; pp. 1-37).
First Office Action dated Jul. 6, 2011 for CN Pat. App. No. 200880023116.X, which is national phase of Intl. App. No. PCT/US2008/063250, filed May 9, 2008 (Inventor—G. Deshpande et al.; Applicant—Constar International, Inc.; pp. 1-8).
Response to Communication filed on Mar. 28, 2013 for EP Pat. App. No. 08795847.6, which is national phase of Intl. App. No. PCT/US2008/063250, filed May 9, 2008 (Inventor—G. Deshpande et al.; Applicant—Constar International, Inc.; pp. 1-2).
Communication pursuant to Article 94(3) EPC dated Sep. 21, 2012 for EP Pat. App. No. 08795847.6, which is national phase of Inyl. App. No. PCT/US2008/063250, filed May 9, 2008 (Inventor—G. Deshpande et al.; Applicant—Constar International, Inc.; pp. 1-4).
Preliminary Amendment filed on Dec. 10, 2009 for EP Pat. App. No. 08795847.6, which is national phase of Intl. App. No. PCT/US2008/063250, filed May 9, 2008 (Inventor—G. Deshpande et al.; Applicant—Constar International, Inc.; pp. 1-5).
Communication pursuant to Article 94(3) EPC dated May 28, 2015 for EP Pat. App. No. 14150235.1, filed Jan. 6, 2014 (Inventor—G. Deshpande et al.; Applicant—Constar International, Inc.; pp. 1-4).
Response to Communication filed on Jan. 15, 2015 for EP Pat. App. No. 14150235.1, filed Jan. 6, 2014 (Inventor—G. Deshpande et al.; Applicant—Constar International, Inc.; pp. 1-3).
Extended European Search Report dated Jun. 17, 2014 for EP Pat. App. No. 14150235.1, filed Jan. 6, 2014 (Inventor—G. Deshpande et al.; Applicant—Constar International, Inc.; pp. 1-9).
First Examination Report dated Dec. 19, 2014 for IN Pat. App. No. 7423/DELNP/2009, which is a national phase of Intl. App. No. PCT/US2008/063250, filed May 9, 2008 (Inventor—G. Deshpande et al.; Applicant—Constar International, Inc.; pp. 1-2).
Response to Office Action filed on Nov. 26, 2014 for CA Pat. App. No. 2,687,081, national phase of Intl. App. No. PCT/US2008/063250, filed May 9, 2008 (Inventor—G. Deshpande et al.; Applicant—Constar International, Inc.; pp. 1-13).
Office Action dated May 26, 2014 for CA Pat. App. No. 2,687,081, national phase of Intl. App. No. PCT/US2008/063250, filed May 9, 2008 (Inventor—G. Deshpande et al.; Applicant—Constar International, Inc.; pp. 1-3).
Notice of Allowance dated Jan. 20, 16 By the Canadian Patent Office for Canadian Application No. 2687081 which was filed on May 9, 2008 (Inventor—Girish N. Deshpande) (1 page).
Response to Office Action filed on Mar. 27, 2012 for CL Pat. App. No. 1391/2008, national phase of Intl. App. No. PCT/US2008/063250, filed May 9, 2008 (Inventor—G. Deshpande et al.; Applicant—Constar International, Inc.; pp. 1-21).
Office Action dated Sep. 14, 2011 for CL Pat. App. No. 1391-08, national phase of Intl. App. No. PCT/US2008/063250, filed May 9, 2008 (Inventor—G. Deshpande et al.; Applicant—Constar International, Inc.; pp. 1-21).
Third Office Action dated May 1, 2013 for CN Pat. App. No. 200880023116.X, national phase of Intl. App. No. PCT/US2008/

(56) References Cited

OTHER PUBLICATIONS 063250, filed May 9, 2008 (Inventor—G. Deshpande et al.; Applicant—Constar International, Inc.; pp. 1-5).
Official Action dated Sep. 12, 2014 for JP Pat. App. No. 2010-507697, which is a national phase of Intl. App. No. PCT/US2008/063250, filed May 9, 2008 (Inventor—G. Deshpande et al.; Applicant—Constar International, Inc.; pp. 1-2).
Final Official Action dated Feb. 24, 2014 for JP Pat. App. No. 2010-507697, which is a national phase of Intl. App. No. PCT/US2008/063250, filed May 9, 2008 (Inventor—G. Deshpande et al.; Applicant—Constar International, Inc.; pp. 1-3).
Official Action dated Nov. 20, 2012 for JP Pat. App. No. 2010-507697, which is a national phase of Intl. App. No. PCT/US2008/063250, filed May 9, 2008 (Inventor—G. Deshpande et al.; Applicant—Constar International, Inc.; pp. 1-3).
Official Action dated Jun. 17, 2015 for JP Pat. App. No. 2013-105954, which is a divisional of JP Pat. App. No. 2010-507697, which is a national phase of Intl. App. No. PCT/US2008/063250, filed May 9, 2008 (Inventor—G. Deshpande et al.; Applicant—Constar International, Inc.; pp. 1-3).
Decision of Refusal dated Jan. 23, 2017 by SIPO for JP Application No. 2015-249201, which was filed on Dec. 22, 2015 (Applicant—Plastipak Packaging, Inc.) (Original 2 pages// Translated 2 pages).
Office Action dated Jun. 24, 2014 for KR Pat. App. No. 10-2009-7025208, which is a national phase of Intl. App. No. PCT/US2008/063250, filed May 9, 2008 (Inventor—G. Deshpande et al.; Applicant—Constar International, Inc.; pp. 1-6).
Office Action dated Apr. 19, 2012 for MX Pat. App. No. MX/a/2009/012183, which is national phase of Intl. App. No. PCT/US2008/063250, filed May 9, 2008 (Inventor—G. Deshpande et al.; Applicant—Constar International, Inc.; pp. 1-2).
Response to Office Action filed on Feb. 3, 2012 for MX Pat. App. No. MX/a/2009/012183, which is national phase of Intl. App. No. PCT/US2008/063250, filed May 9, 2008 (Inventor—G. Deshpande et al.; Applicant—Constar International, Inc.; pp. 1-4).
Office Action dated Sep. 23, 2011 for MX Pat. App. No. MX/a/2009/012183, which is national phase of Intl. App. No. PCT/US2008/063250, filed May 9, 2008 (Inventor—G. Deshpande et al.; Applicant—Constar International, Inc.; pp. 1-3).
International Search Report with Written Opinion dated Oct. 29, 2008 for Intl. App. No. PCT/US2008/063250, filed May 9, 2008 (Inventor—G. Deshpande et al.; Applicant—Constar International, Inc.; pp. 1-14).
Notice of Appeal dated Dec. 19, 2014 to the U.S. Patent and Trademark Office for U.S. Appl. No. 13/849,797, filed Mar. 25, 13 and published as US-2014-0027339-A1 dated Jan. 30, 2014 (Inventor—Girish N. Deshpande) (2 pages).
ExParte Quayle Action dated Nov. 5, 2015 by the U.S. Patent and Trademark Office for U.S. Appl. No. 13/849,797, filed Mar. 25, 2013 and published as US-2014-0027339-A1 dated Jan. 30, 2014 (Inventor-Girish N. Deshpande) (5 pages).
Response to ExParte Quayle Action dated May 5, 16 to the U.S. Patent and Trademark Office for U.S. Appl. No. 13/849,797, filed Mar. 25, 2013 and published as US-2014-0027339-A1 dated Jan. 30, 2014 (Inventor-Girish N. Deshpande) (2 pages).
Notice of Allowance dated Jun. 8, 16 to the U.S. Patent and Trademark Office for U.S. Appl. No. 13/849,797, filed Mar. 25, 2013 and published as US-2014-0027339-A1 dated Jan. 30, 14 (Inventor—Girish N. Deshpande) (7 pages).
Non-Final Office Action dated Sep. 27, 2017 by the U.S. Patent and Trademark Office for U.S. Appl. No. 15/147,532, filed May 5, 2016 and published as 2017/0088332 dated Mar. 30, 2017 (Inventor—Deshpande et al.; Applicant—Plastipak Packaging, Inc.) (6 pages).
Notice of Allowance dated Jul. 5, 2018 by the U.S. Patent and Trademark Office for U.S. Appl. No. 15/147,532, filed May 5, 2016 and published as 2017/0088332 dated Mar. 30, 2017 (Inventor—Deshpande et al.; Applicant—Plastipak Packaging, Inc.) (7 pages).
Non-Final Office Action dated Nov. 18, 2019 by the U.S. Patent and Trademark Office for U.S. Appl. No. 16/189,363, filed Nov. 13, 2018 and published as 2019/0315685 A1 dated Oct. 17, 2019 (Inventor—Deshpande et al.; Applicant—Plastipak Packaging, Inc.) (5 pages).
Response to Non-Final Office Action dated May 15, 2020 with the U.S. Patent and Trademark Office for U.S. Appl. No. 16/189,363, filed Nov. 13, 2018 and published as 2019/0315685 A1 dated Oct. 17, 2019 (Inventor—Deshpande et al.; Applicant—Plastipak Packaging, Inc.) (7 pages).
Final Office Action dated May 29, 2020 by the U.S. Patent and Trademark Office for U.S. Appl. No. 16/189,363, filed Nov. 13, 2018 and published as 2019/0315685 A1 dated Oct. 17, 2019 (Inventor—Deshpande et al.; Applicant—Plastipak Packaging, Inc.) (5 pages).
Response to Final Office Action dated Aug. 26, 2020 with the U.S. Patent and Trademark Office for U.S. Appl. No. 16/189,363, filed Nov. 13, 2018 and published as 2019/0315685 A1 dated Oct. 17, 2019 (Inventor—Deshpande et al.; Applicant—Plastipak Packaging, Inc.) (8 pages).
Notice of Allowance dated Sep. 11, 2020 with the U.S. Patent and Trademark Office for U.S. Appl. No. 16/189,363, filed Nov. 13, 2018 and published as 2019/0315685 A1 dated Oct. 17, 2019 (Inventor—Deshpande et al.; Applicant—Plastipak Packaging, Inc.) (7 pages).
Search Report dated Mar. 17, 2015 for ROC Pat. App. No. 103123705, divisional of ROC Pat. App. No. 097117502, which is a national phase of Intl. App. No. PCT/US2008/063250, filed May 9, 2008 (Inventor—G. Deshpande et al.; Applicant—Constar International, Inc.; pp. 1-1).
Office Action dated Jan. 16, 2017 by the Canadian Patent Office for CA Application No. 2,779,714, which was filed on Sep. 29, 2010 (Applicant—Plastipak Packaging, Inc.) (3 pages).
Office Action dated Aug. 30, 2017 by the Canadian Intellectual Property Office for Patent Application No. 2779714, which was filed on Sep. 29, 2010 and published on Apr. 14, 2011 (Inventor—Deshpande; Applicant—Plastipak Packaging, Inc.) (3 pages).
Response filed Feb. 28, 2014 for EP Pat. App. No. 10822439.5, national phase of Intl. App. No. PCT/US2010/050719, dated Sep. 29, 2010 (Inventor—G. Deshpande; Applicant—Constar International, Inc.; pp. 1-3).
Extended European Search Report dated Jul. 30, 2013 for EP Pat. App. No. 10822439.5, national phase of Intl. App. No. PCT/US2010/050719, dated Sep. 29, 2010 (Inventor—G. Deshpande; Applicant—Constar International, Inc.; pp. 1-6).
International Search Report with Written Opinion dated Jun. 27, 2011 for Intl. App. No. PCT/US2010/050719, dated Sep. 29, 2010 (Inventor—G. Deshpande; Applicant—Constar International, Inc.; pp. 1-7).
Amendment/Request for Re-consideration after Non Final Rejection dated Sep. 4, 2015 to the U.S. Patent and Trademark Office for U.S. Appl. No. 12/893,817, filed Sep. 29, 2010 (Inventor—Girish N. Deshpande) (19 pages).
Non Final Rejection dated Jan. 11, 2016 by the U.S. Patent and Trademark Office for U.S. Appl. No. 12/893,817, filed Sep. 29, 10 (Inventor—Girish N. Deshpande) (11 pages).
Final Rejection dated Aug. 29, 2016 by the U.S. Patent and Trademark Office for U.S. Appl. No. 12/893,817, filed Sep. 29, 2010 and published as US 2011-0123741 A1 dated May 26, 2011 (Inventor—Girish N. Deshpande) (5 Pages).
Notice of Allowance dated Sep. 15, 2017 by the U.S. Patent and Trademark Office for U.S. Appl. No. 12/893,817, filed Sep. 29, 2010 and published as US 2011/0123741 dated May 26, 2011 (Inventor—Deshpande; Applicant—Plastipak Packaging, Inc.) (10 pages).
Examination Report dated Oct. 13, 2014 for AU Pat. App. No. 2010319298, which is a national phase of Intl. App. No. PCT/US2010/056594, filed Nov. 12, 2010 (Inventor—G. Deshpande; Applicant—Constar International, Inc.; pp. 1-4).
Examination Report No. 1 dated Mar. 24, 2017 by the Intellectual Property Office of Australia for Patent Application No. 2016200734, which was filed on Feb. 5, 2016 and published on Mar. 3, 2016 (Inventor—Deshpande; Applicant—Plastipak Packaging, Inc.) (4 pages).
Office Action dated Jul. 25, 2017 by the Canadian Intellectual Property Office for Patent Application No. 2780749, which was filed

(56) References Cited

OTHER PUBLICATIONS on Nov. 12, 2010 and published on May 19, 2011 (Inventor—Deshpande; Applicant—Plastipak Packaging, Inc.)(3 pages).
Preliminary Amendment filed on Jan. 7, 2013 for EP Pat App. No. 10830818.0, which is a national phase of Intl. App. No. PCT/US2010/056594, filed Nov. 12, 2010 (Inventor—G. Deshpande; Applicant—Constar International, Inc.; pp. 1-2).
International Preliminary Report on Patentability dated May 24, 2012 for Intl. App. No. PCT/US2010/056594, dated Nov. 12, 2010 (Inventor—G. Deshpande; Applicant—Constar International, Inc.; pp. 1-5).
International Search Report with Written Opinion dated Jul. 28, 2011 for Intl. App. No. PCT/US2010/056594, dated Nov. 12, 2010 (Inventor—G. Deshpande; Applicant—Constar International, Inc.; pp. 1-8).
Non Final Rejection dated Feb. 8, 2017 by the U.S. Patent and Trademark Office for U.S. Appl. No. 14/935,953, filed Nov. 9, 2015 and published as US-2016-0229988-A1 dated Aug. 11, 2016 (Applicant—Plastipak Packaging, Inc.) (20 pages).
Response to Non-Final Office Action filed on Aug. 8, 2017 with the U.S. Patent and Trademark Office for U.S. Appl. No. 14/935,953, filed Nov. 9, 2015 and published as US 2016/0229988 dated Aug. 11, 2016 (Inventor—Deshpande; Applicant—Plastipak Packaging, Inc.) (32 pages).
Final Office Action dated Aug. 31, 2017 by the U.S. Patent and Trademark Office for U.S. Appl. No. 14/935,953, filed Nov. 9, 2015 and published as US 2016/0229988 dated Aug. 11, 2016 (Inventor—Deshpande; Applicant—Plastipak Packaging, Inc.) (9 pages).
Examination Report No. 1 dated Mar. 24, 2017 by the Intellectual Property Office of Australia for Patent Application No. 2016200891, which was filed on Feb. 11, 2016 and published on Mar. 3, 2016 (Inventor—Deshpande; Applicant—Plastipak Packaging, Inc.) (3 pages).
Office Action dated Sep. 13, 2016 by the Canadian Intellectual Property Office for CA Application No. 2,780,746, which was filed on Nov. 12, 2010 (Applicant—Plastipak Packaging, Inc.) (4 Pages).
Supplementary European Search Report dated Aug. 27, 15 by the European Patent Office for Application No. 10830821.4, which was filed on Nov. 12, 2010 and published as 2499182 dated Sep. 19, 12 (Inventor—Girish N. Deshpande) (2 pages).
European Search Opinion dated Aug. 27, 15 by the European Patent Office for Application No. 10830821.4, which was filed on Nov. 12, 2010 and published as 2499182 dated Sep. 19, 2012 (Inventor—Girish N. Deshpande) (5 pages).
Communication pursuant to Article 94(3) EPC dated Dec. 16, 2016 by the European Patent Office for EP Application No. 10830821.4, which was filed on Nov. 12, 2010 and published as 2499182 dated Sep. 19, 2012 (Applicant—Plastipak Packaging, Inc.) (6 pages).
Communication pursuant to Article 94(3) EPC dated Oct. 17, 2018 by the European Patent Office for EP Application No. 10830821.4, which was filed on Nov. 12, 2010 and published as 2499182 dated Sep. 19, 2012 (Applicant—Plastipak Packaging, Inc.) (5 pages).
Communication pursuant to Article 94(3) EPC dated Oct. 25, 2019 by the European Patent Office for EP Application No. 10830821.4, which was filed on Nov. 12, 2010 and published as 2499182 dated Sep. 19, 2012 (Applicant—Plastipak Packaging, Inc.) (4 pages).
International Preliminary Report on Patentability dated May 24, 2012 for Intl. App. No. PCT/US2010/056598, dated Nov. 12, 2010 (Inventor—G. Deshpande; Applicant—Constar International, Inc.; pp. 1-7).
Examination Report dated Oct. 30, 2014 for AU Pat. App. No. 2010319302, which is a national phase of Intl. App. No. PCT/US2010/056598, dated Nov. 12, 2010 (Inventor—G. Deshpande; Applicant—Constar International, Inc.; pp. 1-3).
International Preliminary Report on Patentability dated May 15, 2012 for Intl. App. No. PCT/US2010/056598, dated Nov. 12, 2010 (Inventor—G. Deshpande; Applicant—Constar International, Inc.; pp. 1-7).
International Search Report with Written Opinion dated Aug. 2, 2011 for Intl. App. No. PCT/US2010/056598, dated Nov. 12, 2010 (Inventor—G. Deshpande; Applicant—Constar International, Inc.; pp. 1-13).
Response to communication filed on Oct. 24, 2014 for EP Pat. App. No. 10830816.4, national phase of Intl. App. No. PCT/US2010/056585, dated Nov. 12, 2010 (Inventor—G. Deshpande; Applicant—Constar International, Inc.; pp. 1-2).
Communication pursuant to Article 94(3) EPC dated Apr. 14, 2014 for EP Pat. App. No. 10830816.4, national phase of Intl. App. No. PCT/US2010/056585, dated Nov. 12, 2010 (Inventor—G. Deshpande; Applicant—Constar International, Inc.; pp. 1-4).
Preliminary Amendment filed on Oct. 17, 2013 for EP Pat. App. No. 10830816.4, national phase of Intl. App. No. PCT/US2010/056585, dated Nov. 12, 2010 (Inventor—G. Deshpande; Applicant—Constar International, Inc.; pp. 1-3).
Extended European Search Report dated Mar. 9, 2013 for EP Pat. App. No. 10830816.4, national phase of Intl. App. No. PCT/US2010/056585, dated Nov. 12, 2010 (Inventor—G. Deshpande; Applicant—Constar International, Inc.; pp. 1-7).
International Search Report with Written Opinion dated Jul. 25, 2011 for Intl. App. No. PCT/US2010/056585, dated Nov. 12, 2010 (Inventor—G. Deshpande; Applicant—Constar International, Inc.; pp. 1-8).
Restriction Requirement dated Dec. 29, 2016 by the U.S. Patent and Trademark Office for U.S. Appl. No. 14/976,766, filed Dec. 21, 2015 and published as US 2016-0311771 A1 dated Oct. 27, 2016 (Applicant—Plastipak Packaging, Inc.) (7 pages).
Ex Parte Quayle Action dated Sep. 22, 2017 by the U.S. Patent and Trademark Office for U.S. Appl. No. 14/976,766, filed Dec. 21, 2015 and published as US 2016/0311771 dated Oct. 27, 2016 (Inventor—Deshpande; Applicant—Plastipak Packaging, Inc.) (7 pages).
First Examination Report dated May 7, 2019 by the Canadian Patent Office for CA Application No. 2871480, which was filed on Apr. 30, 2013 and published as CA 2871480 dated Nov. 7, 2013 (Applicant—Plastipak Packaging, Inc.) (4 pages).
Second Examination Report dated Jan. 28, 2020 by the Canadian Patent Office for CA Application No. 2871480, which was filed on Apr. 30, 2013 and published as CA 2871480 dated Nov. 7, 2013 (Applicant—Plastipak Packaging, Inc.) (3 pages).
Second Office Action dated Jan. 3, 2017 by SIPO for CN Application No. 201380025753.1, which was filed on Apr. 30, 2013 and published as 104379654 dated Feb. 25, 2015 (Applicant—Plastipak Packaging Inc.) (Original—5 pages // Translation—8 pages).
Extended European Search Report dated Feb. 5, 2016 for application EP 13784567.3, filed on Apr. 30, 2013 and published as EP 2844692 dated Mar. 11, 2015 (Applicant—Plastipak Packaging, Inc. // Inventor—Behrendt) (9 pages).
First Office Action dated Mar. 25, 2019 by the Mexican Patent office for MX Application No. MX/a/2014/013181, filed on Apr. 30, 2013 (Applicant—Plastipak Packaging, Inc.) (5 Pages).
Second Office Action dated Dec. 2, 2019 by the Mexican Patent office for MX Application No. MX/a/2014/013181, filed on Apr. 30, 2013 (Applicant—Plastipak Packaging, Inc.) (4 Pages).
Third Office Action dated Jul. 14, 2020 by the Mexican Patent office for MX Application No. MX/a/2014/013181, filed on Apr. 30, 2013 (Applicant—Plastipak Packaging, Inc.) (5 Pages).
Notice of Acceptance dated Sep. 1, 2016 by the Intellectual Property Office of New Zealand for Patent Application No. 702064, which was filed on Apr. 30, 2013 dated Jan. 5, 2017 (Inventor—Behrendt et al.; Applicant—Constar International, Inc.) (1 page).
Letters of Patent dated Jan. 5, 2017 by the Intellectual Property Office of New Zealand for Patent Application No. 702064, which was filed on Apr. 30, 2013 dated Jan. 5, 2017 (Inventor—Behrendt et al.; Applicant—Constar International, Inc.) (1 page).
Office Action dated Feb. 14, 2017 by Japanese Patent Office for JP Application No. 2015-510375, which was filed on Apr. 30, 2013 (Applicant—Plastipak Packaging, Inc.) (Original—5// Translated—7 pages).
International Preliminary Report on Patentability dated Nov. 4, 2014 for Intl. App. No. PCT/US2013/38801, filed Apr. 30, 2013 // Applicant—Constar International LLC // pp. 1-8).

(56) References Cited

OTHER PUBLICATIONS

International Search Report and Written Opinion dated Sep. 5, 2013 for Intl. App. No. PCT/US2013/38801, filed Apr. 30, 2013 // Applicant—Constar International LLC // pp. 1-8).
Non-Final Office Action dated Feb. 1, 2016 for U.S. Appl. No. 13/873,918, filed Apr. 30, 2013 and published as US 2013-0285277 A1 dated Oct. 31, 2013 (Applicant—Constar International, Inc. // Inventor—Behrendt) (20 Pages).
Final Rejection dated Oct. 4, 2016 by the U.S. Patent and Trademark Office for U.S. Appl. No. 13/873,918, filed Apr. 30, 2013 and published as US 2013-0285277 A1 dated Oct. 31, 2013 (Inventor—Kirk Behrendt et al) (19 Pages).
Applicant Initiated Interview Summary dated Feb. 10, 2017 by the U.S. Patent and Trademark Office for U.S. Appl. No. 13/873,918, filed Apr. 30, 2013 and published as US 2013/0285277 dated Oct. 31, 2013 (Inventor—Behrendt et al.; Applicant—Plastipak Packaging, Inc.) (5 pages).
Notice of Appeal filed on Mar. 6, 2017 with the U.S. Patent and Trademark Office for U.S. Appl. No. 13/873,918, filed Apr. 30, 2013 and published as US 2013/0285277 dated Oct. 31, 2013 (Inventor—Behrendt et al.; Applicant—Plastipak Packaging, Inc.) (2 pages).
Response After Final Action and Request for Continued Examination filed on Oct. 6, 2017 with the U.S. Patent and Trademark Office for U.S. Appl. No. 13/873,918, filed Apr. 30, 2013 and published as US 2013/0285277 dated Oct. 31, 2013 (Inventor—Behrendt et al.; Applicant—Plastipak Packaging, Inc.) (15 pages).
Non-final Rejection dated Nov. 3, 2017 by the U.S. Patent and Trademark Office for U.S. Appl. No. 13/873,918, filed Apr. 30, 2013 and published as US 2013-0285277 A1 dated Oct. 31, 2013 (Inventor—Kirk Behrendt et al) (5 Pages).
Response to Non-final Rejection dated May 3, 2018 with the U.S. Patent and Trademark Office for U.S. Appl. No. 13/873,918, filed Apr. 30, 2013 and published as US 2013-0285277 A1 dated Oct. 31, 2013 (Inventor—Kirk Behrendt et al) (9 Pages).
Final Rejection dated May 23, 2018 by the U.S. Patent and Trademark Office for U.S. Appl. No. 13/873,918, filed Apr. 30, 2013 and published as US 2013-0285277 A1 dated Oct. 31, 2013 (Inventor—Kirk Behrendt et al) (8 Pages).
Non Final Rejection dated May 5, 16 by the U.S. Patent and Trademark Office for U.S. Appl. No. 14/466,608, filed Aug. 22, 14 and published as US-2014-0361218-A1 dated Dec. 11, 2014 (Inventor—Girish N. Deshpande) (22 pages).
Final Rejection dated Oct. 21, 2016 by the U.S. Patent and Trademark Office for U.S. Appl. No. /466,608, filed Aug. 22, 2014 and published as US 2014-0361218 A1 dated Dec. 11, 2014 (Inventor—Kirk Behrendt et al) (36 Pages).
Notice of Appeal filed on Mar. 20, 2017 with the U.S. Patent and Trademark Office for U.S. Appl. No. 14/466,608, filed Aug. 22, 2014 and published as US 2014/0361218 dated Dec. 11, 2014 (Inventor—Behrendt et al.; Applicant—Plastipak Packaging, Inc.) (2 pages).
Final Office Action dated Jun. 25, 2018 by the U.S. Patent and Trademark Office for U.S. Appl. No. 14/466,608, filed Aug. 22, 2014 and published as US 2014/0361218 dated Dec. 11, 2014 (Inventor—Behrendt et al.; Applicant—Plastipak Packaging, Inc.) (17 pages).
Final Rejection dated May 31, 2019 by the USPTO Office for U.S. Appl. No. 14/466,608, filed Aug. 22, 2014 and published as US 2014-0361218 A1 dated Dec. 11, 2014 (Inventor—Kirk Behrendt) (18 pages).
Office Action and Search Report dated Jan. 11, 2017 by the Russian Patent Office for RU Application No. 2014148149, which was filed on Apr. 30, 2013 and published as 17 dated Jun. 20, 2016 (Applicant—Plastipak Packaging, Inc.) (8 pages).
Examination Report dated Jan. 31, 2011 for Australian App. No. 2006214438, National Phase of Intl. App. No. PCT/US2006/005216, dated Feb. 15, 2005 (Applicant—Constar International, Inc.; pp. 1-3).
Response to Examination Report filed Oct. 18, 2012 for Australian App. No. 2006214438, National Phase of Intl. App. No. PCT/US2006/005216, dated Feb. 15, 2005 (Applicant—Constar International, Inc.; pp. 1-14).
Office Action dated Jul. 19, 2016 by the Intellectual Property Office of Brazil for Patent Application No. PI0607159-7, which was filed on Feb. 15, 2006 and granted on Mar. 7, 2017 (Inventor—Deshpande et al.) (Original: 8 pages // Translation: 7 pages).
Certificate of Patent dated Mar. 5, 2017 by the Intellectual Property Office of Brazil for Patent Application No. PI0607159-7, which was filed on Feb. 15, 2006 and granted on Mar. 7, 2017 (Inventor—Deshpande et al.) (1 page).
Office Action dated Jul. 9, 2012 for CA App. No. 2,597,918, National Phase of Intl. App. No. PCT/US2006/005216, dated Feb. 15, 2005 (Applicant—Constar International, Inc.; pp. 1-2).
Office Action dated Apr. 11, 2013 for CA App. No. 2,597,918, National Phase of Intl. App. No. PCT/US2006/005216, dated Feb. 15, 2005 (Applicant—Constar International, Inc.; pp. 1-2).
Office Action dated Dec. 19, 2013 for CA App. No. 2,597,918, National Phase of Intl. App. No. PCT/US2006/005216, dated Feb. 15, 2005 (Applicant—Constar International, Inc.; pp. 1-2).
Office Action dated Feb. 13, 2017 by the Canadian Patent Office for CA Application No. 2,893,166, which was filed on Feb. 15, 2016 (Applicant—Plastipak Packaging, Inc.) (3 pages).
Office Action dated Oct. 9, 2012 for CN 201110070505.1, National Phase of Intl. App. No. PCT/US2006/005216, dated Feb. 15, 2005 (Applicant—Constar International, Inc.; pp. 1-4).
Office Action dated Sep. 23, 2011 for CO App. No. 07-092258, National Phase of Intl. App. No. PCT/US2006/005216, dated Feb. 15, 2005 (Applicant—Constar International, Inc.; pp. 1-9).
Supplementary European Search Report dated Jun. 18, 2009 for European Patent No. 06735060.3, National Phase of Intl. App. No. PCT/US2006/005216, dated Feb. 15, 2005 (Applicant—Constar International, Inc.; pp. 1-5).
European Search Opinion dated Jun. 18, 2009 for European Patent No. 06735060.3, National Phase of Intl. App. No. PCT/US2006/005216, dated Feb. 15, 2005 (Applicant—Constar International, Inc.; pp. 1-4).
Response to Communication filed Feb. 17, 2010 for European Patent No. 06735060.3, National Phase of Intl. App. No. PCT/US2006/005216, dated Feb. 15, 2005 (Applicant—Constar International, Inc.; pp. 1-3).
Partial European Search Report dated Apr. 24, 2012 for European Patent No. 11185342.0, Divisional Application of 06735060.3 (Applicant—Constar International, Inc.; pp. 1-7).
Extended European Search Report dated Jul. 13, 2012 for European Patent No. 11185342.0, Divisional Application of 06735060.3 (Applicant—Constar International, Inc.; pp. 1-25).
Communication from the Examining Division dated Jul. 5, 2013 for European Patent No. 11185342.0, Divisional Application of 06735060.3 (Applicant—Constar International, Inc.; pp. 1-5).
Reply to Communication filed Jan. 15, 2014 for European Patent No. 11185342.0, Divisional Application of 06735060.3 (Applicant—Constar International, Inc.; pp. 1-1).
Office Action dated Sep. 9, 2014 for JP App. No. 2013-086037, Divisional Application of JP App. No. 2007-556245, National Phase of Intl. App. No. PCT/US2006/005216, dated Feb. 15, 2005 (Applicant—Constar International, Inc.; pp. 1-2).
Office Action dated Jan. 14, 2013 for KR App. No. 7021236/2007, National Phase of Intl. App. No. PCT/US2006/005216, dated Feb. 15, 2005 (Applicant—Constar International, Inc.; pp. 1-3).
Office Action dated Nov. 20, 2013 for KR App. No. 7021236/2007, National Phase of Intl. App. No. PCT/US2006/005216, dated Feb. 15, 2005 (Applicant—Constar International, Inc.; pp. 1-4).
Office Action dated Nov. 20, 2012 for MX App. No. 07/09868, National Phase of Intl. App. No. PCT/US2006/005216, dated Feb. 15, 2005 (Applicant—Constar International, Inc.; pp. 1-1).
Letters of Patent dated Oct. 13, 2016 by the Intellectual Property Office of Mexico for Patent Application No. MX/a/2013/009959, which was filed on Aug. 29, 2013 and granted as 342800 dated Oct. 31, 2016 (Inventor—Deshpande et al.) (1 page).

(56) References Cited

OTHER PUBLICATIONS

International Search Report and Written Opinion dated Nov. 15, 2007 for Intl. App. No. PCT/US2006/05216, filed on Feb. 15, 2006 (Applicant—Constar International, Inc.; pp. 1-12).
International Preliminary Report on Patentability dated Nov. 23, 2007 for Intl. App. No. PCT/US2006/05216, filed on Feb. 15, 2006 (Applicant—Constar International, Inc.; pp. 1-7).
Communication from the Examining Division dated Jun. 16, 2015 for European Patent No. 11185342.0, Divisional Application of 06735060.3 (Applicant—Constar International, Inc.; pp. 1-2).
Office Action dated Oct. 16, 2012 for JP App. No. 2007-556245, National Phase of Intl. App. No. PCT/US2006/005216, datd Feb. 15, 2005 (Applicant—Constar International, Inc.; pp. 1-2).
Office Action dated Feb. 25, 2014 for JP App. No. 2013-086037, Divisional Application of JP App. No. 2007-556245, National Phase of Intl. App. No. PCT/US2006/005216, dated Feb. 15, 2005 (Applicant—Constar International, Inc.; pp. 1-5).
First Examination Report dated Aug. 17, 2018 by the Intellectual Property Office of Australia for Patent Application No. 2015305288, which was filed on Mar. 21, 2017 (Inventor—Li et al.; Applicant—Plastipak Packaging, Inc.) (5 pages).
International Search Report and Written Opinion dated Nov. 27, 2015 for application PCT/US15/46307, filed on Aug. 21, 2015 (Applicant—Plastipak Packaging, Inc.) (12 pages).
Non-Final Office Action dated Jan. 6, 2016 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (27 pages).
Response to Non-Final Office Action filed on Apr. 29, 2016 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (31 pages).
Final Office Action dated Jul. 21, 2016 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (35 pages).
Response to Final Office Action filed on Jan. 17, 2017 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (13 pages).
Non-Final Office Action dated Feb. 27, 2017 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (35 pages).
Response to Non-Final Office Action filed on May 30, 2017 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (15 pages).
Notice regarding Non-compliant Amendment dated Aug. 10, 2017 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (3 pages).
Response to Notice filed on Oct. 10, 2017 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (10 pages) .
Final Office Action dated Dec. 8, 2017 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (36 pages).
Response to Final Office Action filed on Mar. 30, 2018 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (66 pages).
Notice regarding Non-compliant Amendment dated Aug. 7, 2018 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (3 pages).
Response to Notice filed on Sep. 4, 2018 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (66 pages).
Non-Final Office Action dated Sep. 25, 2018 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (32 pages).
Response to Non-Final Office Action filed on Dec. 26, 2018 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (17 pages).
Supplemental Response to Non-Final Office Action filed on Jan. 14, 2019 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (11 pages).
Final Office Action dated Feb. 13, 2019 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (14 pages) .
Response to Final Office Action filed on Jun. 10, 2019 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (12 pages).
Non-Final Office Action dated Jun. 24, 2019 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (18 pages).
Notice of Appeal filed on Sep. 24, 2019 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (2 pages).
Amendment after Appeal filed on Oct. 24, 2019 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (10 pages).
Advisory Action dated Nov. 4, 2019 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicat—Plastipak Packaging, Inc.) (5 pages).
Amendment after Appeal filed on Nov. 7, 2019 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (10 pages).
Advisory Action dated Nov. 18, 2019 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (4 pages).
Amendment after Appeal filed on Nov. 21, 2019 with the U.S. Patent and Trademark Office for U.S. Patent and Trademark Office

(56) References Cited

OTHER PUBLICATIONS for U.S. Appl. No. 14/466,717, filed Aug. 22, 2014 and published as US 2016-0052694 A1 dated Feb. 25, 2016 (Applicant—Plastipak Packaging, Inc.) (10 pages).
Appeal Brief filed on Dec. 2, 2019 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (17 pages).
Notice of Defective Appeal Brief dated Dec. 23, 2019 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (2 pages).
Supplemental Appeal Brief filed on Jan. 23, 2020 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (3 pages).
Examiner's Answer dated Mar. 30, 2020 by the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (16 pages).
Reply Brief filed on May 28, 2020 with the U.S. Patent and Trademark Office for U.S. Patent and Trademark Office for U.S. Appl. No. 14/466,717, filed Aug. 22, 2014 and published as US 2016-0052694 A1 dated Feb. 25, 2016 (Applicant—Plastipak Packaging, Inc.) (8 pages).
Non Final Rejection dated Jan. 27, 2017 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (12 pages).
Response to Non-Final Office Action filed on Apr. 24, 2017 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (16 pages).
Final Office Action dated Jul. 27, 2017 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (14 pages).
Response to Final Office Action filed on Nov. 16, 2017 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (21 pages).
Notice regarding Non-compliant Amendment dated Nov. 28, 2017 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (2 pages).
Notice regarding Non-compliant Amendment dated Mar. 21, 2018 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (2 pages).
Response to Notice filed on May 21, 2018 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (10 pages).
Non-Final Office Action dated Sep. 5, 2018 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (8 pages).
Notice of Allowance dated Mar. 4, 2019 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (10 pages).
Notice of Allowance dated Apr. 2, 2019 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (3 pages).
Notice of Allowance dated May 20, 2019 by the U.S. Patent and Trademark Office for U.S. Appl. No. 14/517,643, filed Aug. 22, 2014 and published as US 2016-0108207 A1 dated Apr. 21, 2016 (Applicant—Plastipak Packaging, Inc.) (2 pages).
International Search Report and Written Opinion dated Mar. 16, 2016 by the International Searching Authority for Patent Application No. PCT/US2015/056016, which was filed on Oct. 16, 2015 and published as WO 2016/061503 dated Apr. 21, 2016 (Inventor—Li et al.; Applicant; Plastipak Packaging, Inc.) (12 pages).
International Preliminary Report on Patentability dated Apr. 18, 2017 by the International Searching Authority for Patent Application No. PCT/US2015/056016, which was filed on Oct. 16, 2015 and published as WO 2016/061503 dated Apr. 21, 2016 (Inventor—Li et al.; Applicant; Plastipak Packaging, Inc.) (9 pages).
Notice of Allowance dated Jul. 15, 2020 by the Mexican Patent office for MX Application No. MX/a/2014/002954, filed on Sep. 12, 2012 (Applicant—Plastipak Packaging, Inc.) (3Pages).
Examination Report issued by the European Patent Office dated Oct. 19, 2020 in EP Application No. 15834595.9, filed on Aug. 21, 2015 and published as EP 3183292 dated Jun. 28, 2017 (Applicant—Plastipak Packaging, Inc.) (5 pages).
Non-Final Office Action dated Dec. 10, 2020 by the USPTO in U.S. Appl. No. 16/508,282, filed Jul. 10, 2019 and published as US 2020/0172702 A1 dated Jun. 4, 2020 (Applicant—Plastipak Packaging, Inc.) (13 pages).

\* cited by examiner

OXYGEN SCAVENGING COMPOSITIONS, ARTICLES CONTAINING SAME, AND METHODS OF THEIR USE

CROSS-REFERENCE TO RELATED APPLICATIONS

This Application is a Continuation of U.S. application Ser. No. 14/466,717, filed on Aug. 22, 2014, the contents of which are incorporated herein by reference in its' entirety.

BACKGROUND

Many polymers used in packaging materials and other articles are permeable to oxygen. When oxygen permeates a polymeric composition or article, it can cause oxidative damage to the contents of the package. It is therefore desirable for certain polymer compositions and articles to have oxygen scavenging capability, such that when oxygen permeates the composition or article, oxidative damage can be mitigated.

It is known in the art to include an oxygen scavenger in the packaging structure for the protection of oxygen sensitive materials. Such scavengers are believed to react with oxygen that is trapped in the package or that permeates from outside of the package, thus extending to life of package contents. These packages include films, bottles, containers, and the like. Food, beverages (such as beer and fruit juices), cosmetics, medicines, and the like are particularly sensitive to oxygen exposure and require high barrier properties to oxygen to preserve the freshness of the package contents and avoid changes in flavor, texture and color.

Furthermore, in some applications, it is advantageous to use transition metal catalysts, such as cobalt II neodecanoate ("CoNDA") or octoate, in order to accelerate the scavenging rate. Although such transition metal catalysts are currently used, they suffer from several shortcomings. For example, these materials require drying immediately before process use unless they are pre-dried and immediately sealed for protection against exposure to oxygen.

Furthermore, the currently available compositions are typically introduced in a liquid, wax or solid carrier. The need for the carrier results in a significant increase in cost from the additional materials, processing, packaging, freight and energy needed to introduce the catalyst into the final formulation. The final catalyst-related cost can total as high as ten times the raw catalyst material cost. Nevertheless, the carrier system has been necessary to achieve even distribution of the ultra-low amounts of material in resin, and to eliminate formation of degradation products of the catalysts during high-temperature processing from which the final plastic articles are produced. The second consideration is especially important in food, beverage and drug packaging. Direct letting-down of powdered pure catalyst into the formulations has been shown to cause both a strong smell during plastics processing, and perceptible changes to the beverage content after filling.

Thus, there is a need for oxygen scavenging compositions that can be manufactured in a form that is easier to handle, allows even distribution in plastics without the extensive need to use carriers, exhibits minimal degradation during molding, and can be used as a single component in the manufacturing process of oxygen scavenging packaging materials and other articles. These needs and other needs are satisfied by the present invention.

SUMMARY

In accordance with the purpose(s) of the invention, as embodied and broadly described herein, the invention, in one aspect, relates to oxygen scavenging compositions, methods of making the compositions, articles prepared from the compositions, and methods of making the articles.

Disclosed are oxygen scavenging master batch compositions comprising: (a) a transition metal composition; and (b) an oxygen scavenger composition; wherein the transition metal composition is present in an amount greater than about 500 ppm (by metal) based on the total weight of the oxygen scavenging master batch composition; and wherein the oxygen scavenging master batch composition does not comprise greater than about 6 weight percent of a polyester carrier.

Also disclosed are oxygen scavenging concentrate compositions comprising: (a) a transition metal composition; and (b) an oxygen scavenger composition; wherein the transition metal composition is present in an amount greater than about 50,000 ppm (by metal) based on the weight of the oxygen scavenging concentrate composition; and wherein the oxygen scavenging concentrate composition does not comprise greater than about 6 weight percent of a polyester carrier.

Also disclosed are oxygen scavenging master batch compositions comprising: (a) a transition metal composition; (b) an oxygen scavenger composition; and (c) a binder; wherein the transition metal composition is present in an amount greater than about 500 ppm (by metal) based on the total weight of the oxygen scavenging master batch composition.

Also disclosed are methods of making an oxygen scavenging master batch composition comprising, the step of combining, (a) a transition metal composition; and (b) an oxygen scavenger composition, under conditions effective to provide an oxygen scavenging master batch composition; wherein the transition metal composition is present in an amount greater than about 500 ppm (by metal) weight percent based on the weight of the oxygen scavenging master batch composition.

Also disclosed are methods of making oxygen scavenging master batch compositions comprising, the step of combining, in the absence of a polyester carrier, (a) a transition metal composition; and (b) an oxygen scavenger composition; under conditions effective to provide an oxygen scavenging master batch composition; wherein the transition metal composition is present in an amount greater than about 500 ppm (by metal) based on the weight of the oxygen scavenging master batch composition.

Also disclosed are methods of making oxygen scavenging master batch compositions comprising, the step of combining, (a) a transition metal composition; (b) an oxygen scavenger composition; and (c) a binder under conditions effective to provide an oxygen scavenging master batch composition; wherein the transition metal composition is present in an amount greater than about 500 ppm (by metal) based on the weight of the oxygen scavenging master batch composition.

Also disclosed are method of making an oxygen scavenging thermoplastic compositions comprising the steps of (1) combining a polymer with an oxygen scavenging master batch composition in a melt processing zone; wherein the oxygen scavenging master batch composition comprises an oxygen scavenger composition present in an amount greater than about 40 weight percent and a transition metal composition present in an amount greater than about 500 ppm (by metal) based on the weight of the oxygen scavenging master batch composition; and wherein the let down ratio of the oxygen scavenging master batch composition is greater than about 0.5%; and (2) forming oxygen scavenging thermoplastic composition.

Also disclosed are methods of making an article comprising the steps of (1) combining a polymer with an oxygen scavenging master batch composition in a melt processing zone; wherein the oxygen scavenging master batch composition comprise an oxygen scavenger composition present in an amount greater than about 40 weight percent and a transition metal composition present in an amount greater than about 500 ppm (by metal); wherein the let down ratio of the oxygen scavenging master batch composition is greater than about 0.5%; (2) forming a melt; and (3) extruding the melt, thereby forming the article.

Also disclosed are products of the disclosed methods.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DETAILED DESCRIPTION

Figure 1:
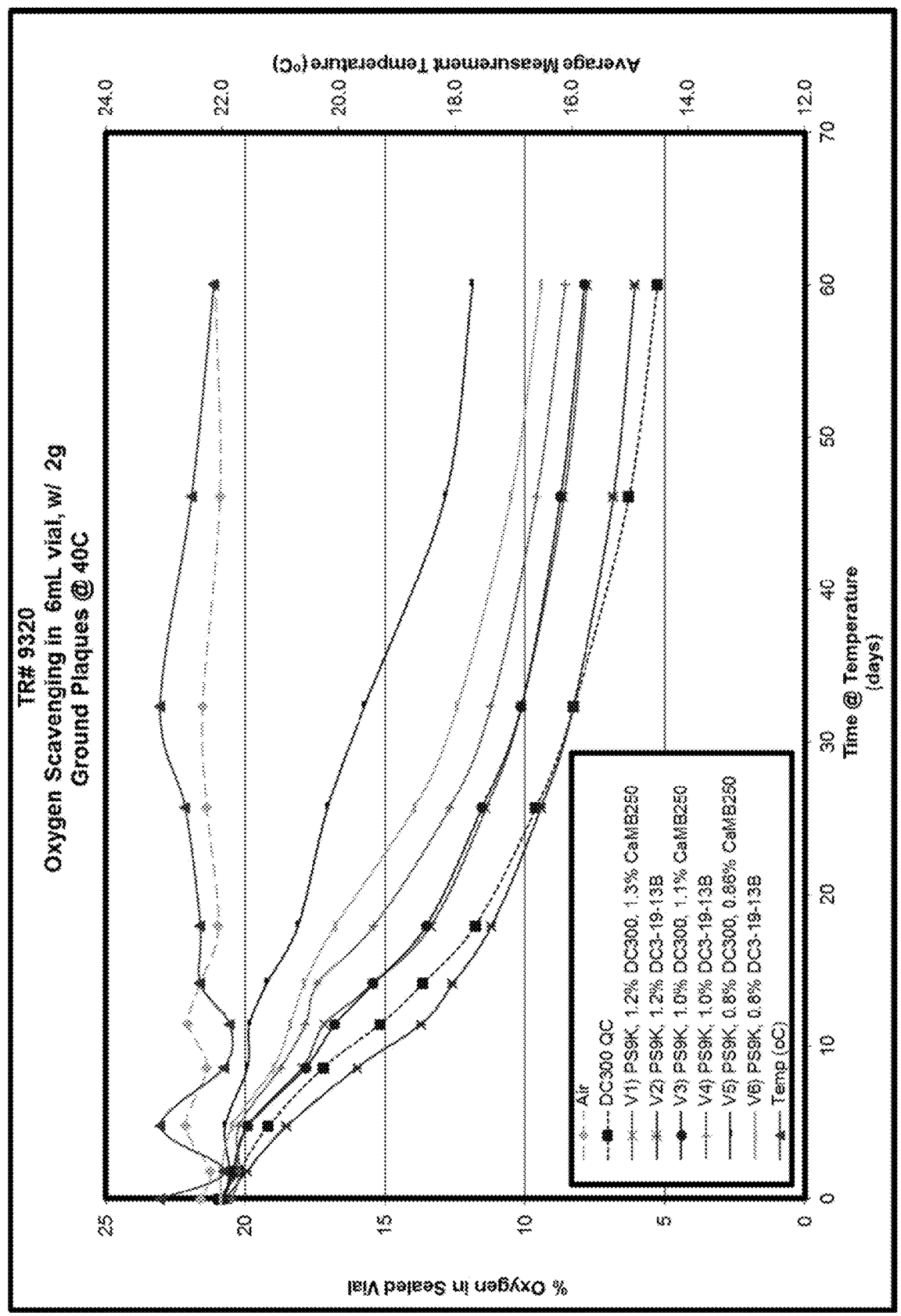
FIG. 1 is a graph illustrating oxygen scavenging performance of polymer compositions prepared using various let-down ratios of a representative oxygen scavenging master batch composition according to present invention.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including steps in methods of making and using the compositions of the invention. Thus, if there are a variety of additional steps that can be performed it is understood that each of these additional steps can be performed with any specific embodiment or combination of embodiments of the methods of the invention.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. DEFINITIONS

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like. Alternatively, for example, reference to processing or making a "polymer," "preform," "article," "container," or "bottle" is intended to include the processing or making of a plurality of polymers, preforms, articles, containers, or bottles.

For example, when a "polymer" is referred to in the specification and the claims, the term should be construed to include not just the reaction product of a single polymerization, but also to blends or physical mixtures of more than one polymer, since the thermoplastic polymers described herein may be satisfactorily blended with one another so that it may be difficult to afterward identify the source. Thus, the phrase a "PET homopolymer or copolymer" (sometimes hereinafter described simply as a "PET polymer") should be construed, for example, to include both the product of a single polymerization as well as mixtures of more than one PET homopolymer or copolymer. Likewise, the phrase a "polyolefin polymer" or a "polybutadiene homopolymer or copolymer" should be construed, for example, to include both the reaction product of a single polymerization as well as mixtures of more than one polybutadiene homopolymer or copolymer.

References to a composition or a polymer blend containing "an" ingredient or "a" polymer is intended to include other ingredients or other polymers, respectively, in addition to the one named.

By "comprising" or "containing" or "having" it is intended that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

When it is stated, for example, that an oxygen-scavenging polymer is added to, blended with, or reacted with the PET polymer, the oxygen-scavenging polymer may either be added neat or as a concentrate, unless the context indicates otherwise. Furthermore, when the oxygen-scavenging polymer is functionalized and capable of reacting with the PET polymer, the oxygen-scavenging polymer may be added as a copolycondensate.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance may or may not occur, and that the description includes instances where said event or circumstance occurs and instances where it does not.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers. The number of monomers/constitutional units within a given polymer may vary widely, ranging, for example, from 5 to 10 to 25 to 50 to 100 to 1000 to 10,000 or more monomer units.

As used herein, the term "monomers" may refer to the free monomers and those that are incorporated into polymers, with the distinction being clear from the context in which the term is used.

As used herein, the term "homopolymer" refers to a polymer formed from a single type of monomer are called homopolymers.

As used herein, the term "copolymer" refers to a polymer formed from two or more different repeating units (monomer residues). The two or more types of monomers within a given copolymer may be present in any of a variety of distributions including random, statistical, gradient and periodic (e.g., alternating) distributions, among others. One particular type of copolymer is a "block copolymer," which as used herein is a copolymer that contains two or more polymer chains of different composition, which chains may be selected from homopolymer chains and copolymer chains (e.g., random, statistical, gradient or periodic copolymer chains). As used herein, a polymer "chain" is a linear assembly of monomers and may correspond to an entire polymer or to a portion of a polymer. By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, "polyester polymer" refers to a condensation polymer in which more than 50 percent of the groups connecting repeat units are ester groups. Thus polyesters may include polyesters, poly(ester-amides) and poly(ester-imides), so long as more than half of the connecting groups are ester groups. For example, suitable polyester polymers can have at least 70% of the connecting groups as esters. Alternatively, suitable polyester polymers can have at least 90% of the connecting groups as ester. In a further example, polyester polymers can have essentially all of the connecting groups as esters. The proportion of ester connecting groups can be estimated to a first approximation by the molar ratios of monomers used to make the polyester.

As used herein, the terms "polyethylene terephthalate" and "PET" refer to a polyester polymer in which the diol repeat units are from ethylene glycol and the dicarboxylic acid repeat units are from terephthalic acid. These terms are meant to include PET no matter how prepared. For example, a monomer used in the preparation of PET can be synthesized by the esterification reaction between terephthalic acid and ethylene glycol with water as a byproduct. Alternatively, a monomer used in the preparation of PET can be prepared by the transesterification reaction between ethylene glycol and dimethyl terephthalate with methanol as a byproduct. Polymerization can be through a polycondensation reaction of the monomers with ethylene glycol as the byproduct.

Furthermore, these terms, PET or polyethylene terephthalate, are meant to include polyethylene terephthalate polymers which are reacted with minor, e.g., less than about 20 percent by weight of the polymer, amounts of modifying agents. Such modifying agents include various diols such as 1,4 butane diol, cyclohexane dimethanol and 1,3 propane diol. Other modifying agents include various diacids such as isophthalic acid, adipic acid, 2,6 naphthalene dicarboxylic acid and p-hydroxy benzoic acid. Minor amounts of chain branching agents and/or chain terminating agents may also be used. Such chain branching agents include, for example, polyfunctional acids and/or polyfunctional alcohols such as trimethylol propane and pentaerythritol. Chain terminating agents include monofunctional alcohols and/or monofunctional carboxylic acids such as stearic acid and benzoic acid. Mixtures of the chain branching and chain terminating agents may also be used. PET which contains such chain branching agents and chain terminating agents is described in U.S. Ser. No. 894,674 filed Apr. 10, 1978 (now U.S. Pat. No. 4,161,579) by Edelman et al and entitled "Extrusion Grade Polyethylene Terephthalate". The disclosure of this patent application is hereby incorporated by reference. Although the terms "polyethylene terephthalate" and "PET" are meant to include polyethylene terephthalate polymers containing minor amounts of modifying agents or chain branching agents, the remainder of this specification, for purposes of illustration, is generally directed to PET which does not contain these modifying agents or chain branching agents.

Furthermore, these terms, PET or polyethylene terephthalate, refer to a thermoplastic polyester resin that can exist both as an amorphous (transparent) and as a semicrystalline (opaque and white) material. PET can also exist as a semicrystalline transparent material, as used in the side walls of PET bottles. In such aspects, the crystals are smaller than the wavelength of visible light and thus do not make the material opaque and white.

It is understood that these terms, "polyethylene terephthalate" and "PET," include both PET polymers and copolymers. For example, PET can be provided as a copolymer having, in addition to terephthalic acid residues and ethylene glycol residues, additional isophthalic acid residues and/or cycloheanedimethanol residues. It is also understood that PET polymer and/or copolymer can be provided as part of a polymer blend.

As used throughout the specification, "ppm" is parts per million by weight.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure

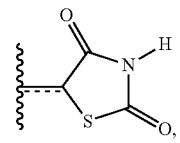

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

In some aspects, a structure of a compound can be represented by a formula:

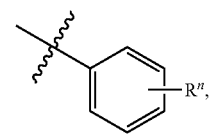

which is understood to be equivalent to a formula:

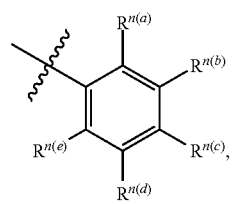

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

B. COMPOSITIONS

In one aspect, the invention relates to oxygen scavenging master batch compositions, comprising: (a) a transition metal composition; and (b) an oxygen scavenger composition; wherein the transition metal composition is present in an amount greater than about 500 ppm (by metal) based on the total weight of the oxygen scavenging master batch composition; and wherein the oxygen scavenging master batch composition does not comprise greater than about 6 weight percent of a polyester carrier.

In another aspect, the invention also relates to oxygen scavenging master batch compositions, comprising: (a) a transition metal composition; (b) an oxygen scavenger composition; and (c) a binder; wherein the transition metal composition is present in an amount greater than about 500 ppm (by metal) based on the total weight of the oxygen scavenging master batch composition.

The oxygen scavenging master batch composition advantageously achieves a high load level of a transition metal composition with an oxygen scavenger. The oxygen scavenging master batch compositions provide a transition metal oxygen scavenging catalyst in an easy to handle solid that can be processed to a form with desired solid handling characteristics. Thus, the oxygen scavenging master batch composition can be milled, pelletized, pulverized, or powdered to appropriate size and solid handling characteristics. For example, the oxygen scavenging master batch composition can be readily milled to a size suitable for blending, e.g. less than about 1.0 mm, for use in co-compaction, co-extrusion and other applications. Moreover, the oxygen scavenging master batch compositions of the invention make feasible co-compaction or co-extrusion of a transition metal composition with a powdered oxygen scavenger. In a further aspect, the oxygen scavenging master batch composition can be readily compacted into pellets or granules, which advantageously can be used as a single component oxygen scavenger/catalyst system for use in packaging applications.

1. Transition Metal Composition

In various aspects, the compositions of the present invention comprise at least one transition metal composition, wherein the transition metal is in a positive oxidation state. The transition metal composition in the presence of a suitable oxygen scavenger composition is believed to catalyze the oxygen scavenging properties of the oxygen scavenger composition. Thus, in one aspect, the transition metal composition enhances the oxygen scavenging properties of the oxygen scavenger composition.

In one aspect, the transition metal can be a transition metal from the first, second, or third transition series of the Periodic Table. The metal can be Rh, Ru, Pd, Os, Ir, Pt, or one of the elements in the series of Sc to Zn (e.g., Sc, Ti, V, Cr, Mn, Fe, Co, Ni, Cu, and Zn). In another aspect, the transition metal in the transition metal composition can be cobalt, copper, rhodium, platinum, rhenium, ruthenium, palladium, tungsten, osmium, cadmium, silver, tantalum, hafnium, vanadium, titanium, chromium, nickel, zinc, iron, iridium, gold, rhenium, molybdenum, or manganese, or a combination thereof.

In one aspect, the transition metal is cobalt. Cobalt can be used in +2 or +3 oxidation states. In some aspects, it is preferred to use cobalt in the +2 oxidation state. In a further aspect, the transition metal is rhodium. For example, rhodium in the +2, +3, or +4 oxidation state can be used. In a still further aspect, the transition metal is manganese. For example, manganese in the +2 or +3 oxidation state can be used. In a yet further aspect, the transition metal is iron. For example, iron in the +2 or +3 oxidation state can be used. In an even further aspect, the transition metal is nickel. For example, nickel in the +2 or +3 oxidation state can be used. In a yet further aspect, the transition metal is copper. For example, copper in the +1 or +2 oxidation state can be used. The transition metal can also be a positive oxidation form of zinc. Alternatively, the transition metal can be ruthenium. The transition metal composition may also be an ionomer, in which case a polymeric counter-ion is employed.

In a further aspect, the transition metal can be present as a salt. The cation of the salt can be the transition metal in a positive oxidation state. A variety of anions can stabilize the positively charged transition metal. Suitable anions for the salts include, but are not limited to, halides, such as chloride; carboxylates, such as neodecanoate, octanoate, acetate, butyrate, lactate, naphthalate, malate, stearate, acetate, acetylacetonate, linoleate, oleate, palmitate, 2-ethylhexanoate, tallate, resinate, 3,5,5-trimethylhexoate, valerate, cyclohexanebutyrate, acetylacetonate, benzaylacetonate, dodecylacetylacetonate, benzoate, oxalate, citrate, tartrate or ethylene glycolate; or as their oxides, borates, carbonates, dioxides, hydroxides, nitrates, phosphates, sulfates, silicates, dialkyldithiocarbamate, disalicylalethylenediamine chelate, or phythalocyanine, among others.

In one aspect, the transition metal is selected from cobalt 2-ethylhexanoate, cobalt oleate, cobalt neodecanoate, cobalt 2-ethylhexanoate, cobalt acetate, cobalt stearate, and cobalt benzoate. In a further aspect, the transition is cobalt neodecanoate.

In a further aspect, the transition metal composition is in the form of a concentrated solid, semi-solid, gel or paste. In a still further aspect, the transition metal composition is in the form of a pastille. In a yet further aspect, the transition metal composition can be in the form of a metal salt powder, crystal, or in a carrier, for example, in a polymer carrier. In a still further aspect, the the transition metal composition can be in a polymer carrier having a microbead shape with a diameter of less than about 1 mm, for example, less than about 0.9, 0.8, 0.7, 0.6, or 0.5 mm.

In a further aspect, the transition metal is present in the pastille in a weight percent amount of about 7% to about 30% (by metal). In a yet further aspect, the transition metal is present in the pastille in an weight percent amount of about 7% to about 25% (by metal). In a still further aspect, the transition metal is present in the pastille in an weight percent amount of about 9% to about 22% (by metal). In an even further aspect, the transition metal is present in the pastille in a weight percent amount of about 11% to about 30% (by metal). In a yet further aspect, the transition metal is present in the pastille in an weight percent amount of about 13% to about 28% (by metal). In a still further aspect, the transition metal is present in the pastille in an weight percent amount of about 15% to about 25% (by metal).

In a further aspect, the transition metal comprises cobalt, copper, rhodium, platinum, rhenium, ruthenium, palladium, tungsten, osmium, cadmium, silver, tantalum, hafnium, vanadium, titanium, chromium, nickel, zinc, iron, iridium, gold, rhenium, molybdenum, or manganese. In a still further aspect, the transition metal comprises cobalt.

In a further aspect, the transition metal in the transition metal composition comprises cobalt. In a yet further aspect, the source of cobalt in the transition metal composition comprises a cobalt carboxylate or cobalt neodecanoate, or mixtures thereof. In a still further aspect, the source of cobalt in the transition metal composition comprises at least one cobalt carboxylate. In a yet further aspect, the source of cobalt in the transition metal composition comprises at least one cobalt neodecanoate.

In a further aspect, at least a portion of the cobalt in the transition metal composition is present in the +2 or +3 oxidation state. In a still further aspect, at least a portion of the cobalt in the transition metal composition is present in the +2 oxidation state.

In a further aspect, the transition metal in the transition metal composition comprises zinc. In a still further aspect, the source of cobalt in the transition metal composition comprises a zinc carboxylate or zinc neodecanoate, or mixtures thereof. In a yet further aspect, the source of zinc in the transition metal composition comprises zinc neodecanoate.

In some aspects, the transition metal composition does not comprise a carrier. In a further aspect, the transition metal composition does not comprise a polymer carrier. In a still further aspect, the transition metal composition does not comprise a polyester carrier. In a yet further aspect, the transition metal composition does not comprise a polyethylene terephthalate carrier.

In other aspects, the transition metal composition can comprise at least one carrier. In a further aspect, the carrier can comprise a polymer, wax, or liquid carrier, or a combination thereof. In a yet further aspect, the polymer carrier of the transition composition comprises a polyester polymer. In a still further aspect, the polyester polymer is a polyalkyl terephthalate, or a copolymer thereof. In a yet further aspect, the polyester polymer is polyethylene terephthalate, or a copolymer thereof. In an even further aspect, the polyester polymer is a polymer comprising repeating aromatic units selected from terephthalic acid residues, isophthalic acid residues, and naphthalenic acid residues. In a still further aspect, the polyester polymer is selected from polyethylene terephthalate, poly(dimethyl cyclohexane terephthalate), polytrimethylene terephthalate, polynaphthalate, or a copolymer thereof.

In a further aspect, the amount of the carrier present in the transition metal composition is at least about 10 weight percent. In a still further aspect, the amount of the carrier present in the transition metal composition is from about 25 weight percent to about 50 weight percent. In a yet further aspect, the amount of the carrier present in the transition metal composition is from about 10 weight percent to about 85 weight percent. In an even further aspect, the amount of the carrier present in the transition metal composition is from about 25 weight percent to about 75 weight percent.

In a further aspect, the amount of the polymer carrier present in the transition metal composition is at least about 75 weight percent. In a still further aspect, the amount of the polymer carrier present in the transition metal composition is from about 70 weight percent to about 90 weight percent.

In a yet further aspect, the amount of the polymer carrier present in the transition metal composition is from about 75 weight percent to about 85 weight percent. In an even further aspect, the amount of the polymer carrier present in the transition metal composition is from about 77 weight percent to about 82 weight percent.

In a further aspect, the polymer carrier present in the transition metal composition is a polyester polymer and is present in an amount that is at least about 75 weight percent. In a still further aspect, the polymer carrier present in the transition metal composition is a polyester polymer and is present in an amount that is from about 70 weight percent to about 90 weight percent. In a further aspect, the polymer carrier present in the transition metal composition is a polyester polymer and is present in an amount that is from about 75 weight percent to about 85 weight percent. In a further aspect, the polymer carrier present in the transition metal composition is a polyester polymer and is present in an amount that is from about 77 weight percent to about 82 weight percent.

In a further aspect, the polymer carrier present in the transition metal composition is PET and is present in an amount that is at least about 75 weight percent. In a still further aspect, the polymer carrier present in the transition metal composition is PET and is present in an amount that is from about 70 weight percent to about 90 weight percent. In a further aspect, the polymer carrier present in the transition metal composition is PET and is present in an amount that is from about 75 weight percent to about 85 weight percent. In a further aspect, the polymer carrier present in the transition metal composition is PET and is present in an amount that is from about 77 weight percent to about 82 weight percent.

2. Oxygen Scavenger Composition

In various aspect, the compositions of the present invention relate to oxygen scavenger compositions. The oxygen scavenger compositions comprise various materials which are selected by one skilled in the art based on their material handling characteristics, end-use, and specifications of the finished articles. The materials may be single or multi-component which can be further mixed, compounded, or blended with additional materials as required. Oxygen scavenger compositions can comprise organic molecules, including monomers or polymers, and/or transition metal compositions. When included in the manufacture of packaging materials, such oxygen scavenger compositions are believed to react with oxygen that is trapped in the package or that permeates from outside of the package, thus extending to life of package contents. These packages include films, bottles, containers, and the like. Food, beverages (such as beer and fruit juices), cosmetics, medicines, and the like are particularly sensitive to oxygen exposure and require high barrier properties to oxygen to preserve the freshness of the package contents and avoid changes in flavor, texture and color.

Use of certain polyamides in combination with a transition metal is known to be useful as the oxygen scavenging material. One particularly useful polyamide is MXD6 which contains meta-xylene residues in the polymer chain. See, for example, U.S. Pat. Nos. 5,639,815; 5,049,624; and 5,021,515. Other oxygen scavenger compositions include potassium sulfite (U.S. Pat. No. 4,536,409), unsaturated hydrocarbons (U.S. Pat. No. 5,211,875), and ascorbic acid derivatives (U.S. Pat. No. 5,075,362).

In one aspect, oxygen scavenger compositions useful in the present invention comprise an N-allylic amine, or N-benzylic amide, or a combination thereof. In a further aspect, oxygen scavenger compositions useful in the present invention comprise: at least one compound of Formula I or II:

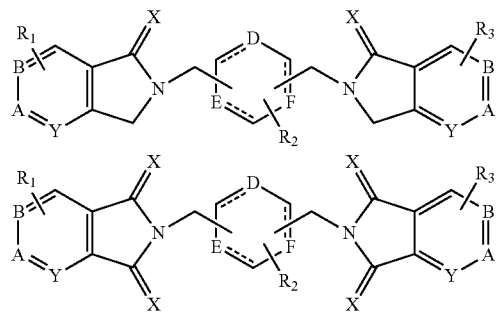

wherein X is selected from the group consisting of O, S and NH; Y, A and B are independently selected from the group consisting of N and CH; D, E and F are independently selected from the group consisting of CH, N, O and S; the symbol—when used in conjunction with a bond line represents a single or a double bond; and $R_1$, $R_2$ and $R_3$ are independently selected from the group consisting of H, electron withdrawing groups and electron releasing groups and a transition metal; and (c) at least one transition metal in a positive oxidation state, said metal being present in the composition in an amount of 10 to 400 ppm; wherein said compound is present in an amount of about 0.10 to 10 weight percent of said composition, which are described in the U.S. Pat. No. 7,994,245 and is incorporated herein by reference.

In a further aspect, the oxygen scavenger composition of the transition metal compact composition comprises the material DC-100. In a still further aspect, the oxygen scavenger composition of the transition metal compact composition comprises the material DC-300. The material DC-100 and DC-300 are manufactured by and are commercially available from Plastipak Packaging, Inc. Preparation of these materials and other material useful as oxygen scavenger compositions of the present invention are described in the patents U.S. Pat. Nos. 7,691,290 and 7,994,245; and in the patent application U.S. Ser. No. 12/945,351 (Publ. No. US 2011/0172335) and U.S. Ser. No. 12/945,355 (Publ. No. US 2011/0117301), which are herein incorporated by reference.

In various aspects, the oxygen scavenger compositions comprises a compound represented by the formula:

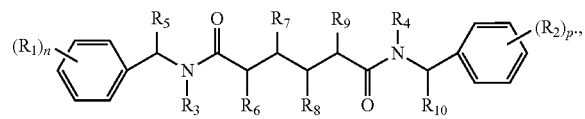

wherein n and p are independently 0 or an integer from 1 to 5; each $R_1$ and $R_2$ is independently selected from H, $C_1$-$C_{12}$ alkyl, $C_1$-$C_6$ alkoxy, $C_6$-$C_{20}$ aryloxy, hydroxy, $C_2$-$C_6$ alkenyl, $NR_{19}R_{20}$, acetyl, nitro, glyceryl, carbohydrate, —C(=O)H, L, or two $R_1$ or two $R_2$ groups can form a group of the formula —O—$R_{18}$—O; $R_3$ and $R_4$ are each H; $R_5$ to $R_{10}$ are independently selected from H or $C_1$-$C_3$ alkyl; and $R_{18}$ is $C_2$-$C_6$ alkyl. In a further aspect, n and p are each 0, 1, or 2. In a still further aspect, $R_1$ and $R_2$ are independently selected from H, $C_1$-$C_4$ alkyl, hydroxy, $C_1$-$C_3$ alkoxy, or carbohydrate. In a yet further aspect, $R_1$ and $R_2$ are independently selected from H, methyl, ethyl, hydroxy, methoxy, ethoxy, or glucose. In an even further aspect, each of $R_5$ to $R_{10}$ are H. In a still further aspect, $R_1$ and $R_2$ are each H.

In various aspects, the oxygen scavenger compositions comprises a compound represented by the formula:

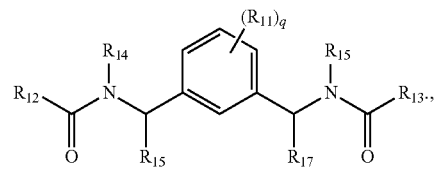

wherein q is 0 or an integer from 1 to 4; L is a linking group of the formula —(O—$R_{21}$)$_z$—O—, —(NH—$R_{21}$)$_z$—NH—, —(NH—C(=O)$R_{22}$)$_t$—NH, —NH—$R_{25}$—NH(C(=O)$R_{26}$NHR$_{25}$NH)$_u$—, —(O—$R_{23}$—O—$R_{24}$—C(=O)$_s$—O— where L is attached to a carbon atom of Ar (for example, replaces a H atom of the Ar) in structure (I) or where $R_{12}$ or $R_{13}$ of structure (II) is L; $R_{11}$ is selected from H, $C_1$-$C_{12}$ alkyl, $C_1$-$C_6$ alkoxy, $C_6$-$C_{20}$ aryloxy, hydroxy, $C_2$-$C_6$ alkenyl, $NR_{19}R_{20}$, acetyl, nitro, glyceryl, carbohydrate, —C(=O)H, L, or two $R_1$ or two $R_2$ groups can form a group of the formula —O—$R_{18}$—O; $R_{11}$ and $R_{13}$ are each, independently, H, $C_1$-$C_6$ alkyl, $C_6$-$C_{20}$ aryl, $C_1$-$C_6$ alkoxy, or L; $R_{14}$, and $R_{15}$ are each H; $R_{16}$, and $R_{17}$ are independently selected from H or $C_1$-$C_3$ alkyl; and $R_{18}$ is $C_2$-$C_6$ alkyl. In a further aspect, $R_{16}$ and $R_{17}$ are each H. In a still further aspect, each $R_{11}$ is independently selected from H, $C_1$-$C_4$ alkyl, hydroxy, or $C_1$-$C_3$ alkoxy, or carbohydrate. In a yet further aspect, each $R_{11}$ is independently selected from H, methyl, ethyl, hydroxy, methoxy, or ethoxy.

In a further aspect, the oxygen scavenger composition comprises a compound represented by a formula:

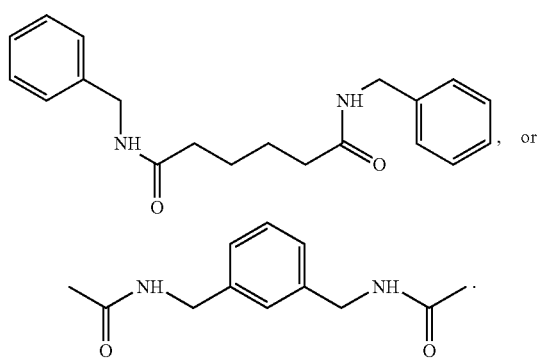

In a further aspect, the oxygen scavenger composition comprises a compound represented by a formula:

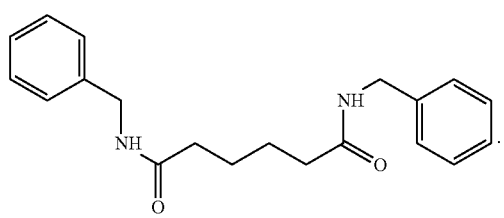 [SMILES: O=C(CCCCC(=O)NCc1ccccc1)NCc1ccccc1]

In a further aspect, the oxygen scavenger composition comprises a compound represented by a formula:

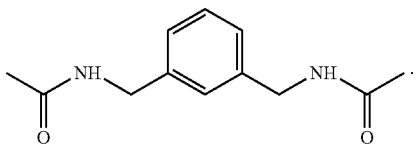 [SMILES: CC(=O)NCc1cccc(CNC(C)=O)c1]

In a further aspect, the oxygen scavenger composition comprises a compound represented by a formula:

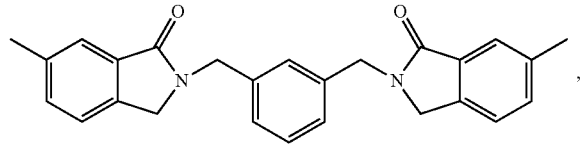

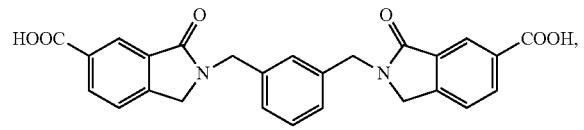 [SMILES: O=C(O)c1ccc2c(c1)C(=O)N(Cc1cccc(CN3Cc4ccc(C(=O)O)cc4C3=O)c1)C2]

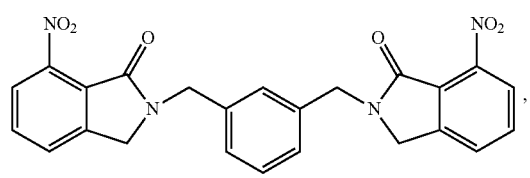 [SMILES: O=C1c2c(cccc2[N+](=O)[O-])CN1Cc1cccc(CN2Cc3cccc([N+](=O)[O-])c3C2=O)c1]

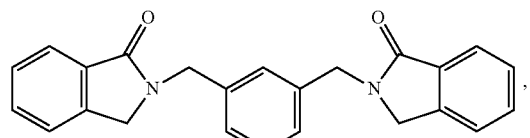

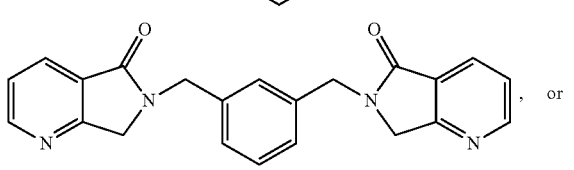, or

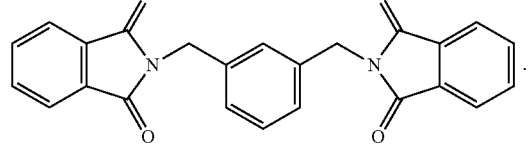

In a further aspect, the oxygen scavenger composition comprises a compound represented by a formula:

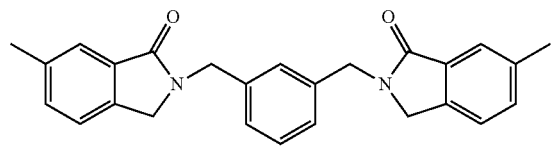

In a further aspect, the oxygen scavenger composition comprises a compound represented by a formula:

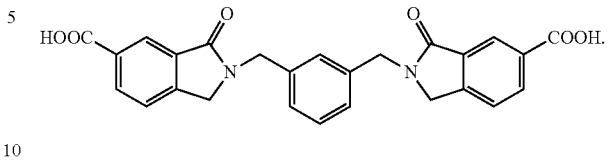

In a further aspect, the oxygen scavenger composition comprises a compound represented by a formula:

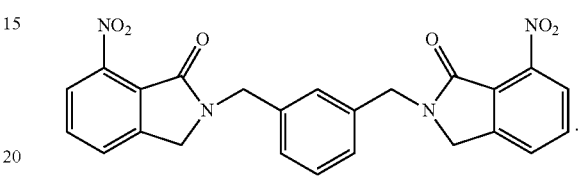

In a further aspect, the oxygen scavenger composition comprises a compound represented by a formula:

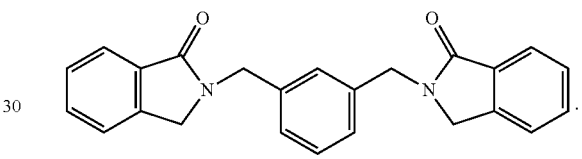

In a further aspect, the oxygen scavenger composition comprises a compound represented by a formula:

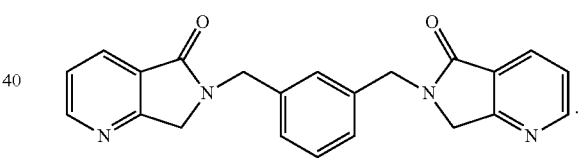

In a further aspect, the oxygen scavenger composition comprises a compound represented by a formula:

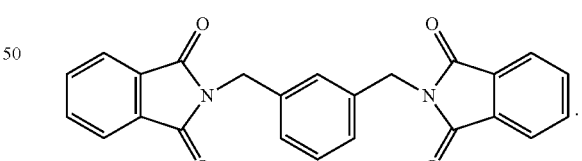

3. Polymer Carrier

In some aspects, the disclosed compositions do not comprise a carrier. In a further aspect, the disclosed compositions do not comprise a polymer carrier. In a still further aspect, the disclosed compositions do not comprise a polyester carrier. In a yet further aspect, the disclosed compositions do not comprise a polyethylene terephthalate carrier.

In other aspects, the disclosed compositions can comprise a polymer carrier. In a further aspect, the disclosed compositions do not comprise greater than about 6 weight percent of a polymer carrier. In a still further aspect, the compositions do not comprise greater than about 5 weight percent of a polymer carrier. In a further aspect, the disclosed compositions do not comprise greater than about 4 weight percent of a polyester carrier. In a still further aspect, the compositions do not comprise greater than about 3 weight percent of a polyester carrier.

If present, a variety of different polymers can be used as the carrier polymer. Since the disclosed compositions enable oxygen scavenging, the carrier polymer generally includes those polymers that can be subject to oxidation. For example, polymers that exhibit at least some oxygen permeability are useful with the disclosed compositions, at least inasmuch as the disclosed compositions can reduce the oxidative damage to the polymer. In one aspect, the polymer carrier comprises a polyester polymer. In a further aspect, the polyester polymer is a polyalkyl terephthalate, or a copolymer thereof. In a yet further aspect, the polyester polymer is polyethylene terephthalate, or a copolymer thereof. In an even further aspect, the polyester polymer is a polymer comprising repeating aromatic units selected from terephthalic acid residues, isophthalic acid residues, and naphthalenic acid residues. In a still further aspect, the polyester polymer is selected from polyethylene terephthalate, poly(dimethyl cyclohexane terephthalate), polytrimethylene terephthalate, polynaphthalate, or a copolymer thereof.

The carrier polymer can be a polymer commonly used in packaging materials including polyethylene, such as low density polyethylene, very low density polyethylene, ultra-low density polyethylene, high density polyethylene, and linear low density polyethylene; polyesters such as (PET), (PEN) and their copolymers such as PET/IP; polyvinyl chloride (PVC); polyvinylidene chloride (PVDC); and ethylene copolymers such as ethylene/vinyl acetate copolymer, ethylene/alkyl (meth)acrylate copolymers, ethylene/(meth) acrylic acid copolymers, and ionomers. Blends of different base polymers also can be used.

In a further aspect, the carrier polymer can include one or more polymers approved by the U.S. Food and Drug Admiration (FDA). Examples include polyethylene terephthalate, polypropylene, and polyethylene.

In a further aspect, the carrier polymer comprises a polyester polymer or copolymer. Preferred polyesters include polymers of phthalic acids, such as polyethylene terephthalate (PET), or a copolymer thereof. PET, for example, can be made from terephthalic acid and ethylene glycol. PET can also be made using dimethyl terephthalate and ethylene glycol. Preferred copolymers of phthalic acids include copolymers of a phthalic acid and one or more hydroxylated organic compounds. Examples of suitable hydroxylated organic compounds include 1, 4-cyclohexandedimethanol, 1,2-propanediol, 1, 4-butanediol, 2,2-dimethyl-1, 3-propanediol, 2-methyl-1, 3-propanediol (2MPDO), 1,6-hexanediol, 1,2-cyclohexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol, or mixtures of these, and the like.

In a still further aspect, the carrier polymer includes a polyethylene terephthalate homopolymer and copolymer modified with one or more polycarboxylic acid modifiers in a cumulative amount of less than about 15 mole %, or about 10 mole % or less, or about 8 mole % or less, or one or more hydroxyl compound modifiers in an amount of less than about 60 mol %, or less than about 50 mole %, or less than about 40 mole %, or less than about 15 mole %, or about 10 mole % or less, or about 8 mole % or less and polyethylene naphthalate homopolymers and copolymers modified with a cumulative amount of less than about 15 mole %, or about 10 mole % or less, or about 8 mole % or less, of one or more polycarboxylic acid modifiers or modified with less than about 60 mol %, or less than about 50 mole %, or less than about 40 mole %, or less than about 15 mole %, or about 10 mole % or less, or about 8 mole % or less of one or more hydroxyl compound modifiers, and blends thereof. In some aspects, the base polymer comprises at least 90 mole %, 92 mole %, or 94 mole % ethylene terephthalate repeat units based on the moles of all repeat units in the polyester polymers.

Polyesters such as PET can be prepared by polymerization procedures known in the art sufficient to effect esterification and polycondensation. Polyester melt phase manufacturing processes include direct condensation of a dicarboxylic acid with a diol, optionally in the presence of one or more esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and polymerization in the presence of a polycondensation catalyst.

In one aspect, the polymer carrier of the invention relates to a polyester polymer. Thus, the polyester polymer is any thermoplastic polyester polymer, e.g. partially aromatic polyester polymers or polyester polymers mainly derived from an aromatic diacid and an aliphatic diol. In a further aspect, the polyester polymer is polyethylene terephthalate. In a still further aspect, the polyethylene terephthalate polymer has ethylene terephthalate units in an amount of at least 60 mole %, in an amount of at least 85 mole %, in an amount at least 90 mole %, and in an amount at least 92 mole %, as measured by the mole % of ingredients added to the reaction mixture. Thus, a polyethylene terephthalate polymer may comprise a copolyester of ethylene terephthalate units and other units derived from an alkylene glycol or aryl glycol with a aliphatic or aryl dicarboxylic acid.

Polyethylene terephthalate polymers can be manufactured by reacting a diacid or diester component comprising at least 60 mole % terephthalic acid or $C_1$-$C_4$ dialkylterephthalate, preferably at least 70 mole %, more preferably at least 85 mole %, even more preferably, at least 90 mole %, and for many applications will be at least 95 mole %, and a diol component comprising at least 60 mole % ethylene glycol, preferably at least 70 mole %, more preferably at least 85 mole %, even more preferably at least 90 mole %, and for many applications, will be at least 95 mole %. It is also preferable that the diacid component is terephthalic acid and the diol component is ethylene glycol. The mole percentage for all of the diacid component totals 100 mole %, and the mole percentage for all of the diol component totals 100 mole %.

In a further aspect, the polyester pellet composition may be formed by admixing polyester polymers with other thermoplastic polymers, such as polycarbonate (PC) and polyamides. The polyester pellet composition can comprise a majority of a polyester polymer, e.g. a polyester polymer present in an amount of at least 80 wt. %, present in an amount at least 95 wt. %, and an in an amount at least 98 wt. %, based on the weight of polymers (excluding fillers, fibers, impact modifiers, or other polymers which may form a discontinuous phase). The polyester polymer can comprise at least 60 wt. % of a polyethylene terephthalate, at least 90 wt. % of a polyethylene terephthalate, and 100 wt. % of a polyethylene terephthalate. A polyethylene terephthalate polymer can contain at least 60 mole % of ethylene terephthalate units. In this embodiment, the polyethylene terephthalate can be made from at least 90 mole % terephthalic acid and at least 90 mole % of ethylene glycol.

Typically, polyesters such as polyethylene terephthalate polymer are made by reacting a glycol with a dicarboxylic acid as the free acid or its dimethyl ester to produce a prepolymer compound which is then polycondensed to produce the polyester. If required, the molecular weight of the polyester can then be increased further by solid state polymerization. In one aspect, after melt phase and/or solid state polycondensation the polyesters have an intrinsic viscosity (It.V.) of at least 0.60 dL/g, and at least 0.70 dL/g measured at 25° C. in a 60/40 ratio by weight of phenol/tetrachloroethane.

In addition to units derived from terephthalic acid, the acid component of the polyester polymer can be modified with units derived from one or more additional dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid units useful for modifying the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "dicarboxylic acid".

In addition to units derived from ethylene glycol, the diol component of the present polyester can be modified with units from additional diols including cycloaliphatic diols preferably having 6 to 20 carbon atoms and aliphatic diols preferably having 3 to 20 carbon atoms. Examples of such diols include diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2,5-ethylhexanediol-(1,3), 2,2-diethyl propane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

Polyesters can be prepared by conventional polymerization procedures well-known in the art sufficient to effect esterification and polycondensation. Polyester polycondensation processes include direct condensation of dicarboxylic acid with the diol, ester interchange, and solid state polymerization methods. Typical polyesterification catalysts which can be used include titanium alkoxides, dibutyl tin dilaruate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present.

For example, a mixture of one or more dicarboxylic acids, preferably aromatic dicarboxylic acids, or ester forming derivatives thereof, and one or more diols may be heated in the presence of esterification and/or transesterification catalysts in an esterification zone, optionally with a polycondensation catalyst, at temperatures in the range of about 150° C. to about 300° C., or alternatively, about 200° C. to about 300° C., and in conventional reactions, typically between about 260° C. to about 300° C., and pressures ranging from atmospheric to about 0.2 mmHg. Normally, the dicarboxylic acid is esterified with the diol(s) at elevated pressure and at a temperature of about 240° C. to about 270° C. Polycondensation reactions are initiated and continued in the melt phase in a prepolymerization zone and finished in the melt phase in a finishing zone, after which polycondensation reactions are continued in the solid state in a solid stating zone. In the prepolymerization zone, molecular weight build up is effected by increasing the temperature from about 260° C. up to about 280° C. and lowering the pressure while excess diol is removed from the mixture. Polycondensation can be continued in a finishing zone in a series of finishing vessels ramped up to higher temperatures until an ItV of about 0.70 dL/g or less is achieved. The catalyst material such as antimony oxide or triacetate may be added to the prepolymerization zone along with phosphorus, cobalt compounds, and colorants, which may optionally be added to the finishing zone. In a typical DMT based process, those skilled in the art recognize that other catalyst material and points of adding the catalyst material and other ingredients vary from a typical direct esterification process.

Other components can be added to the polyester polymer composition to enhance the performance properties. For example, crystallization aids, impact modifiers, surface lubricants, denesting agents, stabilizers, antioxidants, ultraviolet light absorbing agents, metal deactivators, colorants, nucleating agents, acetaldehyde reducing compounds, other reheat rate enhancing aids such as elemental antimony or reduced antimony, carbon black, graphite, black iron oxide, red iron oxide and the like, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion.

In a further aspect, the disclosed composition can comprise at least one binder. In a still further aspect, the binder can comprise a polymer, wax, or liquid binder, or a combination thereof. In a yet further aspect, the binder is a polyolefin-based material. In an even further aspect, the binder is not a polyester polymer 4. Oxygen Scavenging Master Batch Composition In one aspect, the invention relates to an oxygen scavenging master batch composition comprising: (a) a transition metal composition; and (b) an oxygen scavenger composition; wherein the transition metal composition is present in an amount greater than about 500 ppm (by metal) based on the total weight of the oxygen scavenging master batch composition; and wherein the oxygen scavenging master batch composition does not comprise greater than about 6 weight percent of a polyester carrier.

In some aspects, the oxygen scavenging master batch composition does not comprise a polymer carrier. In other aspects, the oxygen scavenging master batch composition can comprise a polymer carrier. In a further aspect, the oxygen scavenging master batch composition does not comprise greater than about 5 weight percent of a polyester carrier. In a still further aspect, the oxygen scavenging master batch composition does not comprise greater than about 4 weight percent of a polyester carrier. In a yet further aspect, the oxygen scavenging master batch composition does not comprise greater than about 2 weight percent of a polyester carrier. In an even further aspect, the oxygen scavenging master batch composition does not comprise greater than about 2 weight percent of a polyester carrier.

In a further aspect, the transition metal composition is present in the oxygen scavenging master batch composition in an amount greater than about 1,000 ppm (by metal) based on the weight of the oxygen scavenging master batch composition. In a still further aspect, the transition metal composition is present in the oxygen scavenging master batch composition in an amount greater than about 5,000 ppm (by metal) based on the weight of the oxygen scavenging master batch composition. In a yet further aspect, the transition metal composition is present in the oxygen scavenging master batch composition in an amount greater than about 10,000 ppm (by metal) based on the weight of the oxygen scavenging master batch composition. In an even further aspect, the transition metal composition is present in the oxygen scavenging master batch composition in an amount greater than about 20,000 ppm (by metal) based on the weight of the oxygen scavenging master batch composition. In a further aspect, the transition metal composition is present in the oxygen scavenging master batch composition in an amount greater than about 25,000 ppm (by metal) based on the weight of the oxygen scavenging master batch composition. In a still further aspect, the transition metal composition is present in the oxygen scavenging master batch composition in an amount greater than about 30,000 ppm (by metal) based on the weight of the oxygen scavenging master batch composition.

In a yet further aspect, the transition metal composition is present in the oxygen scavenging master batch composition in an amount from about 500 ppm to about 50,000 ppm (by metal) based on the weight of the oxygen scavenging master batch composition. In an even further aspect, the transition metal composition is present in the oxygen scavenging master batch composition in an amount from about 500 ppm to about 35,000 ppm (by metal) based on the weight of the oxygen scavenging master batch composition. In a still further aspect, the transition metal composition is present in the oxygen scavenging master batch composition in an amount from about 1,000 ppm to about 35,000 ppm (by metal) based on the weight of the oxygen scavenging master batch composition. In a yet further aspect, the transition metal composition is present in the oxygen scavenging master batch composition in an amount from about 1,000 ppm to about 25,000 ppm (by metal) based on the weight of the oxygen scavenging master batch composition. In an even further aspect, the transition metal composition is present in the oxygen scavenging master batch composition in an amount from about 5,000 ppm to about 30,000 ppm (by metal) based on the weight of the oxygen scavenging master batch composition. In a still further aspect, the transition metal composition is present in the oxygen scavenging master batch composition in an amount from about 10,000 ppm to about 30,000 ppm (by metal) based on the weight of the oxygen scavenging master batch composition. In a yet further aspect, the transition metal composition is present in the oxygen scavenging master batch composition in an amount from about 20,000 ppm to about 30,000 ppm (by metal) based on the weight of the oxygen scavenging master batch composition. In an even further aspect, the transition metal composition is present in the oxygen scavenging master batch composition in an amount from about 10,000 ppm to about 27,500 ppm (by metal) based on the weight of the oxygen scavenging master batch composition.

In a further aspect, the transition metal composition of the oxygen scavenging master batch composition is present in a weight percent amount of from about 0.25% to about 40% based on the weight of the oxygen scavenging master batch composition. In a still further aspect, the transition metal composition of the oxygen scavenging master batch composition is present in a weight percent amount of from about 0.25% to about 35% based on the weight of the oxygen scavenging master batch composition. In a yet further aspect, the transition metal composition of the oxygen scavenging master batch composition is present in a weight percent amount of from about 0.5% to about 25% based on the weight of the oxygen scavenging master batch composition. In an even further aspect, the transition metal composition of the oxygen scavenging master batch composition is present in a weight percent amount of from about 0.5% to about 20% based on the weight of the oxygen scavenging master batch composition. In a still further aspect, the transition metal composition of the oxygen scavenging master batch composition is present in a weight percent amount of from about 0.5% to about 15% based on the weight of the oxygen scavenging master batch composition. In a yet further aspect, the transition metal composition of the oxygen scavenging master batch composition is present in a weight percent amount of from about 0.5% to about 10% based on the weight of the oxygen scavenging master batch composition. In an even further aspect, the transition metal composition of the oxygen scavenging master batch composition is present in a weight percent amount of from about 1% to about 20% based on the weight of the oxygen scavenging master batch composition. In a still further aspect, the transition metal composition of the oxygen scavenging master batch composition is present in a weight percent amount of from about 1% to about 15% based on the weight of the oxygen scavenging master batch composition. In a yet further aspect, the transition metal composition of the oxygen scavenging master batch composition is present in a weight percent amount of from about 1% to about 10% based on the weight of the oxygen scavenging master batch composition.

In a further aspect, the oxygen scavenger composition of the oxygen scavenging master batch composition is present in a weight percent amount of about 40% to about 99.75% based on the weight of the oxygen scavenging master batch composition. In a still further aspect, the oxygen scavenger composition of the oxygen scavenging master batch composition is present in a weight percent amount of about 50% to about 99% based on the weight of the oxygen scavenging master batch composition. In a yet further aspect, the oxygen scavenger composition of the oxygen scavenging master batch composition is present in a weight percent amount of from about 55% to about 99% based on the weight of the oxygen scavenging master batch composition. In an even further aspect, the oxygen scavenger composition of the oxygen scavenging master batch composition is present in a weight percent amount of from about 60% to about 98% based on the weight of the oxygen scavenging master batch composition. In a yet further aspect, the oxygen scavenger composition of the oxygen scavenging master batch composition is present in a weight percent amount of from about 65% to about 98% based on the weight of the oxygen scavenging master batch composition. In a still further aspect, the oxygen scavenger composition of the oxygen scavenging master batch composition is present in a weight percent amount of from about 70% to about 98% based on the weight of the oxygen scavenging master batch composition.

In a further aspect, the oxygen scavenging master batch composition can comprise at least one binder. In a still further aspect, the binder can comprise a polymer, wax, or liquid binder, or a combination thereof. In a yet further aspect, the binder is a polyolefin-based material. In an even further aspect, the binder is not a polyester polymer.

In a further aspect, the amount of the binder present in the oxygen scavenging master batch composition is at least about 1 weight percent. In a still further aspect, the amount of the binder present in the oxygen scavenging master batch composition is from about 1 weight percent to about 40 weight percent. In a yet further aspect, the amount of the binder present in the oxygen scavenging master batch composition is from about 1 weight percent to about 30 weight percent. In an even further aspect, the amount of the binder present in the oxygen scavenging master batch composition is from about 1 weight percent to about 25 weight percent.

In one aspect, disclosed is an oxygen scavenging master batch composition comprising: (a) a transition metal composition; (b) an oxygen scavenger composition; and (c) a binder; wherein the transition metal composition is present in an amount greater than about 500 ppm (by metal) based on the total weight of the oxygen scavenging master batch composition; and wherein the oxygen scavenging master batch composition does not comprise greater than about 6 weight percent of a polyester carrier.

In another aspect, disclosed is an oxygen scavenging master batch composition comprising: (a) a transition metal composition; (b) greater than 50 wt % of an oxygen scavenger composition; and (c) greater than 1 wt % of a binder; wherein the transition metal composition is present in an amount greater than about 500 ppm (by metal) based on the total weight of the oxygen scavenging master batch composition; and wherein the oxygen scavenging master batch composition does not comprise greater than about 6 weight percent of a polyester carrier.

In another aspect, disclosed herein is oxygen scavenging master batch composition comprising: (a) a transition metal composition comprising cobalt; and (b) an oxygen scavenger composition comprising a compound represented by a formula

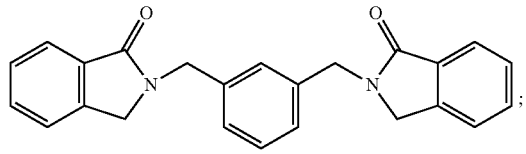 [SMILES: O=C1c2ccccc2CN1Cc1cccc(CN2Cc3ccccc3C2=O)c1]

wherein the transition metal composition is present in an amount greater than about 500 ppm (by metal) based on the total weight of the oxygen scavenging master batch composition; and wherein the oxygen scavenging master batch composition does not comprise greater than about 6 weight percent of a polyester carrier.

In another aspect, disclosed is an oxygen scavenging master batch composition comprising: (a) a transition metal composition; (b) an oxygen scavenger composition; and (c) a binder; wherein the transition metal composition is present in an amount greater than about 500 ppm (by metal) based on the total weight of the oxygen scavenging master batch composition.

In another aspect, disclosed is an oxygen scavenging master batch composition comprising: (a) a transition metal composition; (b) greater than 40 wt % of an oxygen scavenger composition; and (c) greater than 1 wt % of a binder; wherein the transition metal composition is present in an amount greater than about 500 ppm (by metal) based on the total weight of the oxygen scavenging master batch composition.

In another aspect, disclosed is an oxygen scavenging master batch composition comprising: (a) a transition metal composition comprising a polymer carrier; (b) an oxygen scavenger composition; and (c) a binder; wherein the transition metal composition is present in an amount greater than about 500 ppm (by metal) based on the total weight of the oxygen scavenging master batch composition.

In a further aspect, the transition metal composition is present in a weight percent amount of about 500 ppm to about 30,000 ppm (by metal), the oxygen scavenger composition is present in a weight percent amount of about 40% to about 90%, the polymer carrier is present in a weight percent amount of about 1% to about 35%, and the binder is present in a weight percent amount of about 1% to about 30% based on the weight of the oxygen scavenging master batch composition.

In another aspect, disclosed is an oxygen scavenging master batch composition comprising: (a) a transition metal composition comprising cobalt; (b) an oxygen scavenger composition comprising a compound represented by a formula

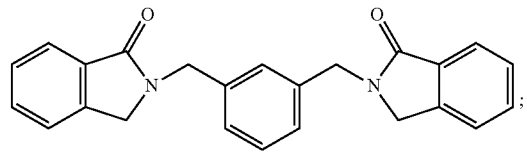 [SMILES: O=C1c2ccccc2CN1Cc1cccc(CN2Cc3ccccc3C2=O)c1]

and (c) a binder; wherein the transition metal composition is present in an amount greater than about 500 ppm (by metal) based on the total weight of the oxygen scavenging master batch composition.

5. Oxygen Scavenging Concentrate Composition

In one aspect, the invention relates to an oxygen scavenging concentrate composition comprising: (a) a transition metal composition; and (b) an oxygen scavenger composition; wherein the transition metal composition is present in an amount greater than about 50,000 ppm (by metal) based on the weight of the oxygen scavenging concentrate composition; and wherein the oxygen scavenging concentrate composition does not comprise greater than about 6 weight percent of a polyester carrier.

In some aspects, the oxygen scavenging concentrate composition does not comprise a polymer carrier. In other aspects, the oxygen scavenging concentrate composition can comprise a polymer carrier. In a further aspect, the oxygen scavenging concentrate composition does not comprise greater than about 5 weight percent of a polyester carrier. In a still further aspect, the oxygen scavenging concentrate composition does not comprise greater than about 4 weight percent of a polyester carrier. In a yet further aspect, the oxygen scavenging concentrate composition does not comprise greater than about 2 weight percent of a polyester carrier. In an even further aspect, the oxygen scavenging concentrate composition does not comprise greater than about 2 weight percent of a polyester carrier.

In a further aspect, the transition metal composition is present in the oxygen scavenging concentrate composition in an amount greater than about 50,000 ppm (by metal) based on the weight of the oxygen scavenging concentrate composition. In a still further aspect, the transition metal composition is present in the oxygen scavenging concentrate composition in an amount greater than about 75,000 ppm (by metal) based on the weight of the oxygen scavenging concentrate composition. In a yet further aspect, the transition metal composition is present in the oxygen scavenging concentrate composition in an amount greater than about 100,000 ppm (by metal) based on the weight of the oxygen scavenging concentrate composition. In an even further aspect, the transition metal composition is present in the oxygen scavenging concentrate composition in an amount greater than about 125,000 ppm (by metal) based on the weight of the oxygen scavenging concentrate composition. In a further aspect, the transition metal composition is present in the oxygen scavenging concentrate composition in an amount greater than about 150,000 ppm (by metal) based on the weight of the oxygen scavenging concentrate composition. In a still further aspect, the transition metal composition is present in the oxygen scavenging concentrate composition in an amount greater than about 175,000 ppm (by metal) based on the weight of the oxygen scavenging concentrate composition.

In a yet further aspect, the transition metal composition is present in the oxygen scavenging concentrate composition in an amount from about 50,000 ppm to about 175,000 ppm (by metal) based on the weight of the oxygen scavenging concentrate composition. In an even further aspect, the transition metal composition is present in the oxygen scavenging concentrate composition in an amount from about 50,000 ppm to about 150,000 ppm (by metal) based on the weight of the oxygen scavenging concentrate composition. In a still further aspect, the transition metal composition is present in the oxygen scavenging concentrate composition in an amount from about 50,000 ppm to about 125,000 ppm (by metal) based on the weight of the oxygen scavenging concentrate composition. In a yet further aspect, the transition metal composition is present in the oxygen scavenging concentrate composition in an amount from about 75,000 ppm to about 150,000 ppm (by metal) based on the weight of the oxygen scavenging concentrate composition. In an even further aspect, the transition metal composition is present in the oxygen scavenging concentrate composition in an amount from about 75,000 ppm to about 125.00 ppm (by metal) based on the weight of the oxygen scavenging concentrate composition. In a still further aspect, the transition metal composition is present in the oxygen scavenging concentrate composition in an amount from about 100,000 ppm to about 175,000 ppm (by metal) based on the weight of the oxygen scavenging concentrate composition. In a yet further aspect, the transition metal composition is present in the oxygen scavenging concentrate composition in an amount from about 100,000 ppm to about 150,000 ppm (by metal) based on the weight of the oxygen scavenging concentrate composition. In an even further aspect, the transition metal composition is present in the oxygen scavenging concentrate composition in an amount from about 100,000 ppm to about 125,000 ppm (by metal) based on the weight of the oxygen scavenging concentrate composition.

In a further aspect, the transition metal composition of the oxygen scavenging concentrate composition is present in a weight percent amount of from about 25% to about 75% based on the weight of the oxygen scavenging concentrate composition. In a still further aspect, the transition metal composition of the oxygen scavenging concentrate composition is present in a weight percent amount of from about 25% to about 65% based on the weight of the oxygen scavenging concentrate composition. In a yet further aspect, the transition metal composition of the oxygen scavenging concentrate composition is present in a weight percent amount of from about 25% to about 55% based on the weight of the oxygen scavenging concentrate composition. In an even further aspect, the transition metal composition of the oxygen scavenging concentrate composition is present in a weight percent amount of from about 35% to about 75% based on the weight of the oxygen scavenging concentrate composition. In a still further aspect, the transition metal composition of the oxygen scavenging concentrate composition is present in a weight percent amount of from about 35% to about 65% based on the weight of the oxygen scavenging concentrate composition. In a yet further aspect, the transition metal composition of the oxygen scavenging concentrate composition is present in a weight percent amount of from about 35% to about 55% based on the weight of the oxygen scavenging concentrate composition. In an even further aspect, the transition metal composition of the oxygen scavenging concentrate composition is present in a weight percent amount of from about 45% to about 75% based on the weight of the oxygen scavenging concentrate composition. In a still further aspect, the transition metal composition of the oxygen scavenging concentrate composition is present in a weight percent amount of from about 45% to about 65% based on the weight of the oxygen scavenging concentrate composition. In a yet further aspect, the transition metal composition of the oxygen scavenging concentrate composition is present in a weight percent amount of from about 45% to about 55% based on the weight of the oxygen scavenging concentrate composition.

In a further aspect, the oxygen scavenger composition of the oxygen scavenging concentrate composition is present in a weight percent amount of from about 25% to about 75% based on the weight of the oxygen scavenging concentrate composition. In a still further aspect, the oxygen scavenger composition of the oxygen scavenging concentrate composition is present in a weight percent amount of from about 25% to about 65% based on the weight of the oxygen scavenging concentrate composition. In a yet further aspect, the oxygen scavenger composition of the oxygen scavenging concentrate composition is present in a weight percent amount of from about 25% to about 55% based on the weight of the oxygen scavenging concentrate composition. In an even further aspect, the oxygen scavenger composition of the oxygen scavenging concentrate composition is present in a weight percent amount of from about 35% to about 75% based on the weight of the oxygen scavenging concentrate composition. In a still further aspect, the oxygen scavenger composition of the oxygen scavenging concentrate composition is present in a weight percent amount of from about 35% to about 65% based on the weight of the oxygen scavenging concentrate composition. In a yet further aspect, the oxygen scavenger composition of the oxygen scavenging concentrate composition is present in a weight percent amount of from about 35% to about 55% based on the weight of the oxygen scavenging concentrate composition. In an even further aspect, the oxygen scavenger composition of the oxygen scavenging concentrate composition is present in a weight percent amount of from about 45% to about 75% based on the weight of the oxygen scavenging concentrate composition. In a still further aspect, the oxygen scavenger composition of the oxygen scavenging concentrate composition is present in a weight percent amount of from about 45% to about 65% based on the weight of the oxygen scavenging concentrate composition. In a yet further aspect, the oxygen scavenger composition of the oxygen scavenging concentrate composition is present in a weight percent amount of from about 45% to about 55% based on the weight of the oxygen scavenging concentrate composition.

In a further aspect, the oxygen scavenger composition of the oxygen scavenging concentrate composition is present in a weight percent amount of about 60% to about 99.75% based on the weight of the oxygen scavenging concentrate composition. In a still further aspect, the oxygen scavenger composition of the oxygen scavenging concentrate composition is present in a weight percent amount of about 70% to about 99% based on the weight of the oxygen scavenging concentrate composition. In a yet further aspect, the oxygen scavenger composition of the oxygen scavenging concentrate composition is present in a weight percent amount of from about 75% to about 99% based on the weight of the oxygen scavenging concentrate composition. In an even further aspect, the oxygen scavenger composition of the oxygen scavenging concentrate composition is present in a weight percent amount of from about 70% to about 98% based on the weight of the oxygen scavenging concentrate composition. In a yet further aspect, the oxygen scavenger composition of the oxygen scavenging concentrate composition is present in a weight percent amount of from about 75% to about 98% based on the weight of the oxygen scavenging concentrate composition. In a still further aspect, the oxygen scavenger composition of the oxygen scavenging concentrate composition is present in a weight percent amount of from about 80% to about 98% based on the weight of the oxygen scavenging concentrate composition.

In one aspect, disclosed herein is an oxygen scavenging concentrate composition comprising: (a) a transition metal composition comprising cobalt; and (b) an oxygen scavenger composition comprising a compound represented by a formula

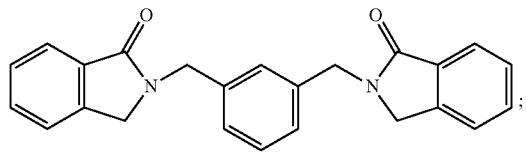 [SMILES: O=C1c2ccccc2CN1Cc1cccc(CN2Cc3ccccc3C2=O)c1]

wherein the transition metal composition is present in an amount greater than about 50,000 ppm (by metal) weight percent based on the total weight of the oxygen scavenging concentrate composition; and wherein the oxygen scavenging concentrate composition does not comprise greater than about 6 weight percent of a polyester carrier.

C. METHODS OF MAKING

In one aspect, the invention relates to methods of making oxygen scavenging master batch compositions. In a further aspect, the invention relates to methods of making oxygen scavenging concentrate compositions. In a yet further aspect, the invention relates to making an article.

The compositions of this invention can be prepared by employing the methods as described in the following, in addition to other standard manipulations that are known in the literature, exemplified in the experimental sections or clear to one skilled in the art.

Reactions, processes, procedures, and methodologies used to generate the compositions of this invention are prepared by employing reactions as described in this invention (hereinabove and herein below), in addition to other standard manipulations known in the literature or to one skilled in the art. The following examples are provided so that the invention might be more fully understood, are illustrative only, and should not be construed as limiting.

1. Method of Making Oxygen Scavenging Compositions

In one aspect, the invention relates to methods of making an oxygen scavenging concentrate composition comprising, the step of combining, (a) a transition metal composition; and (b) an oxygen scavenger composition; under conditions effective to provide an oxygen scavenging concentrate composition; wherein the transition metal composition is present in an amount greater than about 50,000 ppm (by metal) based on the weight of the oxygen scavenging concentrate composition; and wherein the oxygen scavenger composition is present in an amount greater than about 25 weight percent based on the weight of the oxygen scavenging concentrate composition.

In another aspect, the invention relates to methods of making an oxygen scavenging concentrate composition comprising, the step of combining, in the presence of less that about 6 weight percent of a polyester carrier, (a) a transition metal composition; and (b) an oxygen scavenger composition; under conditions effective to provide an oxygen scavenging concentrate composition; wherein the transition metal composition is present in an amount greater than about 50,000 ppm (by metal) based on the weight of the oxygen scavenging concentrate composition; and wherein the oxygen scavenger composition is present in an amount greater than about 25 weight percent based on the weight of the oxygen scavenging concentrate composition.

In another aspect, the invention relates to methods of making an oxygen scavenging master batch composition comprising, the step of combining, in the absence of a polymer carrier, (a) a transition metal composition; and (b) an oxygen scavenger composition; under conditions effective to provide an oxygen scavenging master batch composition; wherein the transition metal composition is present in an amount greater than about 500 ppm (by metal) based on the weight of the oxygen scavenging master batch composition.

In another aspect, the invention relates to methods of making an oxygen scavenging master batch composition comprising, the step of combining, in the absence of a polymer carrier, (a) a transition metal composition; (b) an oxygen scavenger composition; and (c) a binder, under conditions effective to provide an oxygen scavenging master batch composition; wherein the transition metal composition is present in an amount greater than about 500 ppm (by metal) based on the weight of the oxygen scavenging master batch composition.

In another aspect, the invention relates to a method of making an oxygen scavenging master batch composition comprising, the step of combining, in presence of less than about 6 weight percent a polyester carrier, (a) a transition metal composition; and (b) an oxygen scavenger composition; under conditions effective to provide an oxygen scavenging master batch composition; wherein the transition metal composition is present in an amount greater than about 500 ppm based on the weight of the oxygen scavenging master batch composition.

In another aspect, the invention relates to a method of making an oxygen scavenging master batch composition comprising, the step of combining, in the absence of a polyester carrier, (a) an oxygen scavenging concentrate composition; and (b) an oxygen scavenger composition; under conditions effective to provide an oxygen scavenging master batch composition; wherein the oxygen scavenging concentrate composition comprises an oxygen scavenger composition present in an amount greater than about 40 weight percent and a transition metal composition present in an amount greater than about 50,000 ppm (by metal) based on the weight of the oxygen scavenging concentrate composition.

In another aspect, the invention relates to a method of making an oxygen scavenging master batch composition comprising, the step of combining, in the presence of less than about 6 weight percent of a polyester carrier, (a) an oxygen scavenging concentrate composition; and (b) an oxygen scavenger composition; under conditions effective to provide an oxygen scavenging master batch composition; wherein the oxygen scavenging concentrate composition comprises an oxygen scavenger composition present in an amount greater than about 40 weight percent and a transition metal composition present in an amount greater than about 50,000 ppm (by metal) based on the weight of the oxygen scavenging concentrate composition.

In various aspects, the transition metal composition can be provided in any desired form. In a further aspect, the transition metal composition can be provided in the form of a concentrated solid, semi-solid, gel or paste. In a still further aspect, the transition metal composition can be provided in the form of a pastille. In a yet further aspect, the transition metal composition can be provided in the form of a metal salt powder, crystal, or in a carrier, for example, in a polymer carrier. In a still further aspect, the the transition metal composition can be provided in a polymer carrier having a microbead shape with a diameter of less than about 1 mm, for example, less than about 0.9, 0.8, 0.7, 0.6, or 0.5 mm.

In a further aspect, conditions effective to provide can comprise blending the components. In some aspects, the components are blended in the presence of a binder. In other aspects, the components are blended in the absence of a binder.

In one aspect, the blended components can be compacted or extruded into any desired form or morphology. In a further aspect, the blended components can be compacted into any desired form or morphology using a compaction device. In a still further aspect, the blended components can be extruded into any desired form or morphology using an extrusion device, for example, as a microbead. In a further aspect, the compaction or extrusion of the blended components can be performed at above or below the melting temperature of the components.

In a further aspect, conditions effective to provide can comprise adjusting the temperature of one or more of the components. In a further aspect, the transition metal composition is heated prior to combining with other components. In a still further aspect, the heating is performed under vacuum.

In a further aspect, conditions effective to provide can comprise introducing or combining one or more components with the other components in a drop-wise fashion to provide coated droplets. In a still further aspect, the oxygen scavenger composition can be introduced into or combined with other components in a drop-wise fashion. In an even further aspect, the transition metal composition can be introduced into or combined with other components in a drop-wise fashion. In a still further aspect, the oxygen scavenger composition can be introduced into or combined with other components in any desired form or morphology. In a yet further aspect, the oxygen scavenger composition can be in the form of a solution, suspension, hot melt, powder, flake, pressed compact, or combinations thereof. In an even further aspect, the transition metal composition can be introduced into or combined with other components in any desired form or morphology. In a yet further aspect, the transition metal composition can be in the form of a solution, suspension, powder, flake, pressed compact, or combinations thereof. Thus, by way of example, and without limitation, an oxygen scavenger hot melt composition can be introduced drop-wise into a transition metal powder composition to provide catalyst coated droplets.

In a further aspect, conditions effective to provide can comprise evaporating a liquid or solvent. In a still further aspect, the method can comprise agitation or sparging. For example, and without limitation, a suspension of an oxygen scavenger composition and transition metal composition can be subjected to agitation and evaporation to provide the desired final composition.

In various aspects, the methods can comprise at least one extruding step. In a further aspect, the methods can comprise the step of extruding a component or composition. In one aspect, the transition metal composition is subjected to an extrusion step with the oxygen scavenger composition. In another aspect, the transition metal composition is subjected to first extrusion step, with for example, a carrier. In a further aspect, the transition metal composition is then subjected to a second extrusion step with the oxygen scavenger composition. In some aspects, the at least one extrusion step is in the presence of a binder. In other aspects, the at least one extrusion step is in the absence of a binder.

In a further aspect, the composition is extruded with a size less than about 5.0 mm screen size. In a yet further aspect, the composition is extruded with a size less than about 4.0 mm screen size. In an even further aspect, the composition is extruded with a size less than about 3.0 mm screen size. In a still further aspect, the composition is extruded with a size less than about 2.0 mm screen size. In a yet further aspect, the composition is extruded with a size less than about 1.0 mm screen size. In an even further aspect, the composition is extruded with a size less than about 0.5 mm screen size.

In a further aspect, the method can comprise the step of milling. In a still further aspect, the method can further comprise the step of milling the composition following the step of extrusion. In a yet further aspect, the composition is milled to a size less than about 5.0 mm screen size. In a still further aspect, the composition is milled to a size less than about 4.0 mm screen size. In an even further aspect, the composition is milled to a size less than about 3.0 mm screen size. In a still further aspect, the composition is milled to a size less than about 2.0 mm screen size. In a yet further aspect, the composition is milled to a size less than about 1.0 mm screen size. In an even further aspect, the composition is milled to a size less than about 0.5 mm screen size.

In a further aspect, the method further comprises the step of pulverizing a component or composition. In a yet further aspect, the composition is pulverized to a size less than about 5.0 mm screen size. In a still further aspect, the composition is pulverized to a size less than about 4.0 mm screen size. In an even further aspect, the composition is pulverized to a size less than about 3.0 mm screen size. In a still further aspect, the composition is pulverized to a size less than about 2.0 mm screen size. In a yet further aspect, the composition is pulverized to a size less than about 1.0 mm screen size. In an even further aspect, the composition is pulverized to a size less than about 0.5 mm screen size.

In various aspects, the method can comprise at least one heating step. In some aspects, the heating step can comprise a drying step. In other aspects, the heating step can comprise the step of heating the compositon to remove harmful or unwanted side products, for example, side products that can interfere with oxygen scavenging performance.

In a further aspect, the method further comprises the step of heating the composition following the step of milling. In an even further aspect, the method further comprises the step of heating the composition following the step of pulverizing. In a yet further aspect, the method further comprises the step of heating the composition following the step of extrusion. In a still further aspect, the heating can be in an atmosphere of dried air or other inert gas, such as nitrogen, and if desired, under sub-atmospheric pressure.

In a further aspect, the method further comprises the step of drying the composition following the step of milling. In an even further aspect, the method further comprises the step of drying the composition following the step of pulverizing. In a yet further aspect, the method further comprises the step of drying the composition following the step of extrusion. In a still further aspect, the drying can be in an atmosphere of dried air or other inert gas, such as nitrogen, and if desired, under sub-atmospheric pressure.

The extrusion step can be accomplished by a variety of extrusion or compounding methods known in the art. Any suitable equipment designed to melt the components, to combine the components, and to mix the components may be used. Alternatively, the functions may be performed in more than one piece of equipment. This may be in continuous or batch processes. Example of equipment that may be used include, but are not limited to, two-roll mills, two rotor mixers with open mixing chambers, internal mixers with a single rotor, internal mixers with multiple counter rotating rotors, internal mixers with multiple co-rotating rotors, internal mixers with multiple mixing chambers, single screw extruders, planetary screw extruders, co-rotating twin screw extruders, counter rotating twin screw extruders conical extruders, and the like. These mixing devices are well known in the art.

Alternatively, the components may also be mixed using static mixers in which the mixing elements are stationary and the mixing is accomplished by multiple reorientations of a mixture containing components as it flows through the static elements, or may be mixed in stirred vessels.

2. Method of Making Oxygen Scavenging Compacted Pellets

In one aspect, the invention relates to methods of making oxygen scavenging master batch pellets comprising the steps of: (1) extruding an oxygen scavenging master batch composition, the composition comprising: (a) a transition metal composition; and (b) an oxygen scavenger composition; wherein the transition metal composition is present in an amount greater than about 500 ppm (by metal) based on the weight of the oxygen scavenging master batch composition; (2) processing the extrudate comprising the oxygen scavenging master batch composition to particulate form by milling or pulverization, wherein the particle size is less than about 5.0 mm screen size; (3) preparing a homogeneous mixture comprising the particulate oxygen scavenging master batch composition, wherein the oxygen scavenging masterbatch composition is present in an amount greater than about 50 weight percent; and (4) forming compacted single pellets from the homogeneous mixture, thereby producing oxygen scavenging masterbatch compacted pellets.

In another aspect, the invention relates to methods of making oxygen scavenging concentrate pellets comprising the steps of: (1) extruding an oxygen scavenging concentrate composition, the composition comprising: (a) a transition metal composition; and (b) an oxygen scavenger composition; wherein the transition metal composition is present in an amount greater than about 5,000 ppm (by metal) based on the weight of the oxygen scavenging concentrate composition; (2) processing the extrudate comprising the oxygen scavenging concentrate composition to particulate form by milling or pulverization, wherein the particle size is less than about 5.0 mm screen size; (3) preparing a homogeneous mixture comprising the particulate oxygen scavenging concentrate composition, wherein the oxygen scavenging concentrate composition is present in an amount greater than about 50 weight percent; and (4) forming compacted single pellets from the homogeneous mixture, thereby producing oxygen scavenging concentrate compacted pellets.

Manufacture of the compacted pellets of the invention can be by methods known to one skilled in the art involving various compactors and sifters to obtain compacted pellets of a desired size distribution. For example, compaction can be accomplished using a roller compactor such as a Bepex or Fitzpatrick Chilsonator roller compactor. A 7×10 chilosonator roller compactor is commonly found in industrial use, but a chilsonator of this particular configuration is not required. A non-limiting example of manufacture of the compacted can comprise the following steps: a) the homogenous mixture as described in the foregoing paragraph can be feed in a chilsonator roller compactor, which initially generates a somewhat continuous stick; b) the somewhat continuous stick generated by the chilsonator roller compactor is fed into a mill with about a ⅜ inch screen, thereby producing smaller granules; c) the granules from the preceding step can then pass through a separator, e.g. a screen sifter such as a 48 inch Sweco or similar screen sifter with a ring cleaner option; and d) then the material can then be discharged through a rare earth station into drums. The screen sifter can equipped with a #4 and/or #12 mesh sizes. The exact nature of the screen meshes in each deck of the sifter can be adjusted to optimize production efficiency and quality standards required of the compacted pellets. In various further aspects, attrition testing can be carried out on random drums to monitor the effectiveness of the compaction process. Alternatively, attrition testing can occur on every nth drum, e.g. every fifth drum.

In various aspects, the compacted pellets of the present invention can have the attrition test specifications following the last step of compaction and sifting as shown in Table 1.

TABLE 1

| Attrition Test | |
|---|---|
| Mesh/Sieve Size | SPEC |
| Drum # | n/a |
| % > 4 mesh | 5 max |
| % < 4 > 12 mesh | Up to 100 |
| % < 12 > 30 mesh | 40 max |
| % < 30 (fines) bottom pan | Target < 2: 5 max |

Attrition testing can be carried as deemed appropriate, and are known to one skilled in the art. For example, the attrition test results of Table 1 can be obtained as follows: a) a 50 g sample is placed onto the top 4-mesh screen of a 4/12/30/Pan stack and shaken 3 minutes using the Rotap; b) after Rotap, material on each screen is weighed and converted to a percentage of the entire sample; c) material in the pan (the initial <30 mesh fines) is discarded; d) sample on the remaining screens is combined back together, and 25 g of this combined sample is placed onto the 30-mesh screen along with five pennys; e) the screen stack is placed in the Rotap, and shaken for 3 minutes; and 0<30 mesh material in the pan after the attrition test is weighed and converted to a percentage.

3. Method of Making an Oxygen Scavenging Thermoplastic Composition

In one aspect, the invention relates to a method of making an oxygen scavenging thermoplastic composition comprising the steps of (1) combining a polymer with an oxygen scavenging master batch composition in a melt processing zone; and (2) forming an oxygen scavenging thermoplastic composition.

In another aspect, the invention relates to a method of making an oxygen scavenging thermoplastic composition comprising the steps of (1) combining a polymer with an oxygen scavenging master batch composition in a melt processing zone; wherein the oxygen scavenging master batch composition comprises an oxygen scavenger composition present in an amount greater than about 50 weight percent and a transition metal composition present in an amount greater than about 500 ppm (by metal) based on the weight of the oxygen scavenging master batch composition; and wherein the let down ratio of the oxygen scavenging master batch composition is greater than about 0.5%; and (2) forming an oxygen scavenging thermoplastic composition.

4. Method of Making an Article

In one aspect, the invention relates to methods of making an article comprising the steps of (1) combining a polymer with an oxygen scavenging master batch composition in a melt processing zone; wherein the oxygen scavenging master batch composition comprise an oxygen scavenger composition present in an amount greater than about 50 weight percent and a transition metal composition present in an amount greater than about 500 ppm (by metal); wherein the let down ratio of the oxygen scavenging master batch composition is greater than about 0.5%; (2) forming a melt; and (3) extruding the melt, thereby forming the article.

In a further aspect, extrusion is injection molding. In a still further aspect, extrusion is sheet or film extrusions. In a yet further aspect, the article is a preform. In an even further aspect, the article is a bottle.

In a further aspect, the method further comprises addition of one or more additives selected from colorants, acetaldehyde scavengers, reheat agents, UV absorbers or inhibitors, stabilizers, thermal stabilizers, and nonionic colorant harmonizers. In a still further aspect, the additive is a visually effective amount of colorant in the melt processing zone. In a yet further aspect, the additive is a nonionic colorant harmonizer in an amount of from about 0.010 to about 10 weight percent in the melt processing zone. In a yet further aspect, the nonionic colorant harmonizer is an aliphatic ester having 6 to 24 carbons.

In a further aspect, the method further comprises a first stream comprising the oxygen scavenger master batch composition to a melt processing zone for making the article, a second stream comprising polymer particles, and optionally a third stream comprising other additives such as colorant, acetaldehyde scavengers, reheat agents, UV absorbers or inhibitors, stabilizers, thermal stabilizers; and wherein first, second and optional third streams are fed to a melt processing zone for making the article.

In one aspects, the polymer is a polyester. In a further aspect, the polyester can comprise polyethylene terephthalate or a copolymer thereof.

In a further aspect, the polymer and the oxygen scavenger master batch composition are combined in the melt processing zone as individual streams or as pellet/pellet dry blends, or as combinations thereof. In a still further aspect, the let down ratio of the oxygen scavenger master batch compositions is from about 0.5% to about 12%. In a yet further aspect, the let down ratio of the oxygen scavenger master batch composition is from about 1.0% to about 11.0%. In an even further aspect, the let down ratio of the oxygen scavenger master batch composition is from about 1.0% to about 10.0%. In a still further aspect, the let down ratio of the oxygen scavenger master batch composition is from about 1.3% to about 10.8%. In a yet further aspect, the let down ratio of the oxygen scavenger master batch composition is from about 1.0% to about 9.6%. In a still further aspect, the let down ratio of the oxygen scavenger master batch compositions is from about 1.0% to about 9.2%. In a yet further aspect, the let down ratio of the oxygen scavenger master batch composition is from about 1.3% to about 10.0%. In an even further aspect, the let down ratio of the oxygen scavenger master batch composition is from about 1.3% to about 9.8%. In a still further aspect, the let down ratio of the oxygen scavenger master batch composition is from about 1.5% to about 10.8%. In a yet further aspect, the let down ratio of the oxygen scavenger master batch composition is from about 1.5% to about 9.6%.

In a further aspect, articles such as bottle performs are prepared from polymer particles (e.g. PET) and the oxygen scavenger master batch composition by feeding them into the melt processing zone as individual streams or as combined streams of particle/particle dry blends. Thus, there is provided a process for the manufacture of a preform comprising combining solid polyester particles comprising polyester polymers and solid transition metal compacted obtained by the methods described in the invention, into an melt processing zone, forming a melt, and forming an article directly from the melt.

In a yet further aspect, a blend comprising solid polyester particles comprising polyester polymers and a solid oxygen scavenger master batch composition can be simultaneously dried in a drying zone, under conditions effective to at least partially remove moisture from the blend. The moisture level of the blend of solid polyester particles and oxygen scavenger master batch composition can be reduced down to less than 0.015 wt. %, or less than 0.010 wt. %, or less than 0.005 wt. %. In an apparatus containing a drying zone, radiant or convective heat, or electromagnetic or microwave radiation, or any other source for removal of moisture, is emitted from a drying zone or is passed through at least a portion of the mechanical drying zone and contacts the particle blend to remove at least a portion of surface and/or internal water moisture.

The articles obtained by the concentrates of the invention may be extruded products such as sheets and fibers, or injection molded articles such as bottle preforms and other shapes. In a preferred embodiment, the articles produced from the melt processing zone are the preforms, sheets, and trays for packaging food, pharmaceuticals, medical supplies, and beverages.

D. ARTICLES

Various articles can be prepared from the disclosed compositions. Thus, the articles prepared from the compositions will also have the composition present in the article. Suitable articles include vessels and films, such as flexible sheet films, flexible bags, pouches, semi-rigid and rigid containers such as bottles (e.g. PET bottles) or metal cans, or combinations thereof. Typical flexible films and bags include those used to package various food items and can be made up of one or a multiplicity of layers to form the overall film or bag-like packaging material. The composition of the present invention can be used in one, some or all of the layers of such packaging material.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (e.g., vitamin degradation), or color of the drink. The compositions are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions can also be used in the manufacture of cosmetic containers and containers for pharmaceuticals or medical devices.

Other suitable articles include rigid or semi-rigid articles including plastic, such as those utilized for juices, soft drinks, as well as thermoformed trays or cup normally having thickness in the range of from 100 to 1000 micrometers. The walls of such articles can comprise single or multiple layers of materials. The article can also take the form of a bottle or can, or a crown, cap, crown or cap liner, plastisol or gasket. The composition of the present invention can be used as an integral layer or portion of, or as an external or internal coating or liner of, the formed semi-rigid or rigid packaging article. As a liner, the composition can be extruded as a film along with the rigid article itself, e.g., by coextrusion, extrusion coating, or an extrusion lamination process, so as to form the liner in situ during article production; or alternatively can be adhered by heat and/or pressure, by adhesive, or by any other suitable method.

When the compositions are used in a wall or as a layer of a wall, the permeability of the composition for oxygen is advantageously not more than about 3.0, or about 1.7, or about 0.7, or about 0.2, or about 0.03 $cm^3$-mm/($m^2$-atm-day). In some aspects, the permeability of the composition is not more than about three-quarters of that in the absence of the amide compound. In some aspects, the permeability is not more than about one half, one-tenth in certain embodiments, one twenty-fifth in other embodiments, and not more than one-hundredth of that in the absence of the amide compound.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

Oxygen permeability of an article can be maintained for a longer period of time by storing the article in a sealed container or under an inert atmosphere such as nitrogen prior to use with oxygen sensitive materials.

The articles can be made by various methods known in the art. Generally, the articles are prepared by melt processing methods (i.e., a melt of the composition). Such processes generally include injection molding, stretch blow molding, extrusion, thermoforming, extrusion blow molding, and (specifically for multilayer structures) co-extrusion and lamination using adhesive tie layers. Orientation, e.g., by stretch blow molding, of the polymer can be used with phthalate polyesters because of the known mechanical advantages that result.

The melt processing zone for making the article can be operated under customary conditions effective for making the intended articles, such as preforms, bottles, trays, and other articles mentioned above. In one aspect, such conditions are effective to process the melt without substantially increasing the intrinsic viscosity of the melt and which are ineffective at promoting transesterification reactions. In some preferred aspects, suitable operating conditions effective to establish a physical blend of the base polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig (pound-force per square inch gauge) to about 900 psig. In some embodiments, the residence time of the melt on the screw can range from about 1 to about 4 minutes.

E. EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Batches of the oxygen scavenging master batch and concentrate compositions were prepared using a vacuum oven as described herein. Briefly, the transition metal composition are combined with a powdered oxygen scavenger, e.g. Constar International DC-300, to provide the oxygen scavenging master batch and concentrate compositions as described herein.

1. Example 1: Preparation of Oxygen Scavenging Master Batch Composition

Briefly, 97 grams of DC300 dry basis and 3 grams of grounded CoNDA pastilles were combined in a 500 mL wide-mouth jar. The vacuum port of the oven was connected with vacuum tubing to a wet ice/salt trap/Dewar flask, and the trap to the vacuum. The oven was then heated to 200° C., and the wide-mouth jar was placed inside the oven. The vacuum was started and maintained at a level below 25 mm Hg. The temperature was held at 200° C. and vacuum level held below 25 mm Hg for 2 hours. After this period, the vacuum was released with nitrogen, moved to a glove bag that has been purged with nitrogen, and the melt was poured in to a brownie pan inside the nitrogen bag. The material and pan was allowed to cool to room temperature while maintaining the nitrogen atmosphere. Once at room temperature the pan can be removed from the nitrogen bag, and flexed to break the particles free from the pan into flakes. The flaked material provides a 3% oxygen scavenging master batch compositions. In one aspect, the material is appropriate for let-down into PET resins at 1.45% to achieve performance similar to the corresponding two-component system at a let-down ratio of 1.4% DC300 and 80 ppm CoNDA (calculated based on Co element).

2. Example 2: Preparation of Oxygen Scavenging Concentrate Composition

Briefly, 85 grams DC300 dry basis and 85 grams CoNDA pastilles were combined in a 2 L heavy walled Erlenmeyer flask with side arm connected with vacuum tubing to a wet ice/salt trap/Dewar flask. The connection was then continued to a vacuum gauge and vacuum pump, and the pump vented to a hood. The vacuum was started and verified it is possible to reach 25 mm Hg. Detected leaks were eliminated and a 25 mm Hg level was verified before proceeding to the next step. Next, the flask was placed in an oil bath and heated to 235° C., holding at 235° C. for 2 hours. After this period, the vacuum was released with nitrogen, moved to a glove bag that has been purged with nitrogen, and the melt was poured in to a brownie pan inside the nitrogen bag. The material and pan was allowed to cool to room temperature while maintaining the nitrogen atmosphere. Once at room temperature the pan can be removed from the nitrogen bag, and flexed to break the particles free from the pan into flakes. This flaked material yields 50% oxygen scavenging concentrate composition. According to some aspects, the 50% concentrate composition can be used to prepared large and/or multiple batches of oxygen scavenging master batch composition.

3. Example 3: Preparation of Oxygen Scavenging Master Batch Composition from Oxygen Scavenging Concentrate Composition Briefly, 6 grams of oxygen scavenging concentrate is combined with 94 grams DC 300 dry basis in a large heavy wall Erlenmeyer flask with side arm connected with vacuum tubing to a wet ice/salt trap/Dewar flask. The connection is then continued to a vacuum gauge and vacuum pump, and the pump vented to a hood. The vacuum was started and verified it is possible to reach 25 mm Hg. The flask was placed in an oil bath and heated to 235° C., and held at 235° C. for 2 hours. If the DC 300 contained solvent from wetcake, the material was heated to 80° C. for one hour before heating to 235° C. After this period, the vacuum was released, moved to a glove bag that was purged with nitrogen, and the melt was poured in to a brownie pan inside the nitrogen bag. The material and pan was allowed to cool to room temperature. Once at room temperature the pan can be removed from the nitrogen bag, and flexed to break the particles free from the pan into flakes. This flaked material yields a 3% oxygen scavenging master batch composition. In various aspects, the 3% oxygen scavenging master batch compositions can be used for let-down into PET resins at 1.45% to achieve performance similar to the corresponding two-component system at a let-down ratio of 1.4% DC300 and 80 ppm CoNDA (calculated based on Co element).

4. Example 4: Prophetic Large Scale Preparation of Oxygen Scavenging Master Batch Composition from Oxygen Scavenging Concentrate Composition Briefly, 84 grams of oxygen scavenging concentrate can be combined with 1,362 grams dry DC 300 in an extra-large zipper sealed bag. The mixture can then be melted and processed with an industrial flaker/pelletizer into any desired product morphologies.

In various aspects, equivalent let-down ratios (LDR) for oxygen scavenging master batch compositions of the present invention compared with equivalent let-down ratios of DC300 component and CoNDA component in two-component systems are provided below in Table 2.

TABLE 2

| Blue Diamond System | | | Two-Component System | |
| --- | --- | --- | --- | --- |
| DC300 (%) | CoNDA (%) | LDR (%) | DC300 LDR (%) | CoNDA LDR (ppm) |
| 97.29 | 2.71 | 1.44 | 1.4 | 80 |
| 97.09 | 2.91 | 1.34 | 1.3 | 80 |
| 96.85 | 3.15 | 1.24 | 1.2 | 80 |
| 96.57 | 3.43 | 1.14 | 1.1 | 80 |
| 96.25 | 3.75 | 1.04 | 1.0 | 80 |
| 95.84 | 4.16 | 0.94 | 0.9 | 80 |
| 95.35 | 4.65 | 0.84 | 0.8 | 80 |

5. Example 5: Oxygen Scavenging Performance of Oxygen Scavenging Master Batch Composition in Pet Plaques at Different Let-Down Ratios PET Plaques formed using 3% oxygen scavenging master batch composition (DC3-19-13B; 97% DC300, 3% CoNDA) produced as described herein at a let-down ratio of 1.2%, 1.0% and 0.8%, respectively, or two-component system (DC-300; CaMB) were collected and tested for oxygen scavenging ability using Oxysense™. The plaques were ground to fine powder, placed in a sealed glass vial, with a photoluminescent window on the wall. The intensity of light reflected from the photoluminescent window is proportional to the oxygen content in the vial. The Oxysense™ data for the above polymer compositions at various let-down ratios and a control composition (DC-300) comprised of Constar International's DC-300 are shown in FIG. 1. 1.2% LDR of the inventive oxygen scavenging master batch composition contains slightly less (97%) DC300 than 1.2% LDR DC300, and applies to other formulations as well. As seen from the data of FIG. 1, the oxygen scavenging performance of the polymer compositions comprising the inventive oxygen scavenging master batch composition correlate with the let-down ratio of the oxygen scavenging master batch composition. In all scenarios, the inventive oxygen scavenging master batch composition performance was comparable to the corresponding two-component systems at the equivalent let-down ratio.

6. Example 6: Oxygen Scavenging Performance of Oxygen Scavenging Master Batch Composition in DAK CF746A Resin with or without Colorants Colorless and yellow-colored bottle strips formed using DAK CF746A resin and 1.34% of the inventive oxygen scavenging master batch composition (BFSLc; 97.1% DC300, 2.9% CoNDA) produced as described herein or two-component system (DC-300; CaMB) were collected and tested for oxygen scavenging ability using Oxysense™. The bottle strips were placed in a sealed glass vial, with a photoluminescent window on the wall. The intensity of light reflected from the photoluminescent window is proportional to the oxygen content in the vial. The Oxysense™ data for the above polymer compositions at various let-down ratios and a control composition (DC-300) comprised of Constar International's DC-300 are shown in FIG. 2. 1.34% LDR of the inventive oxygen scavenging master batch composition contains the same amount of DC300 as 1.3% LDR DC300.

Figure 2:
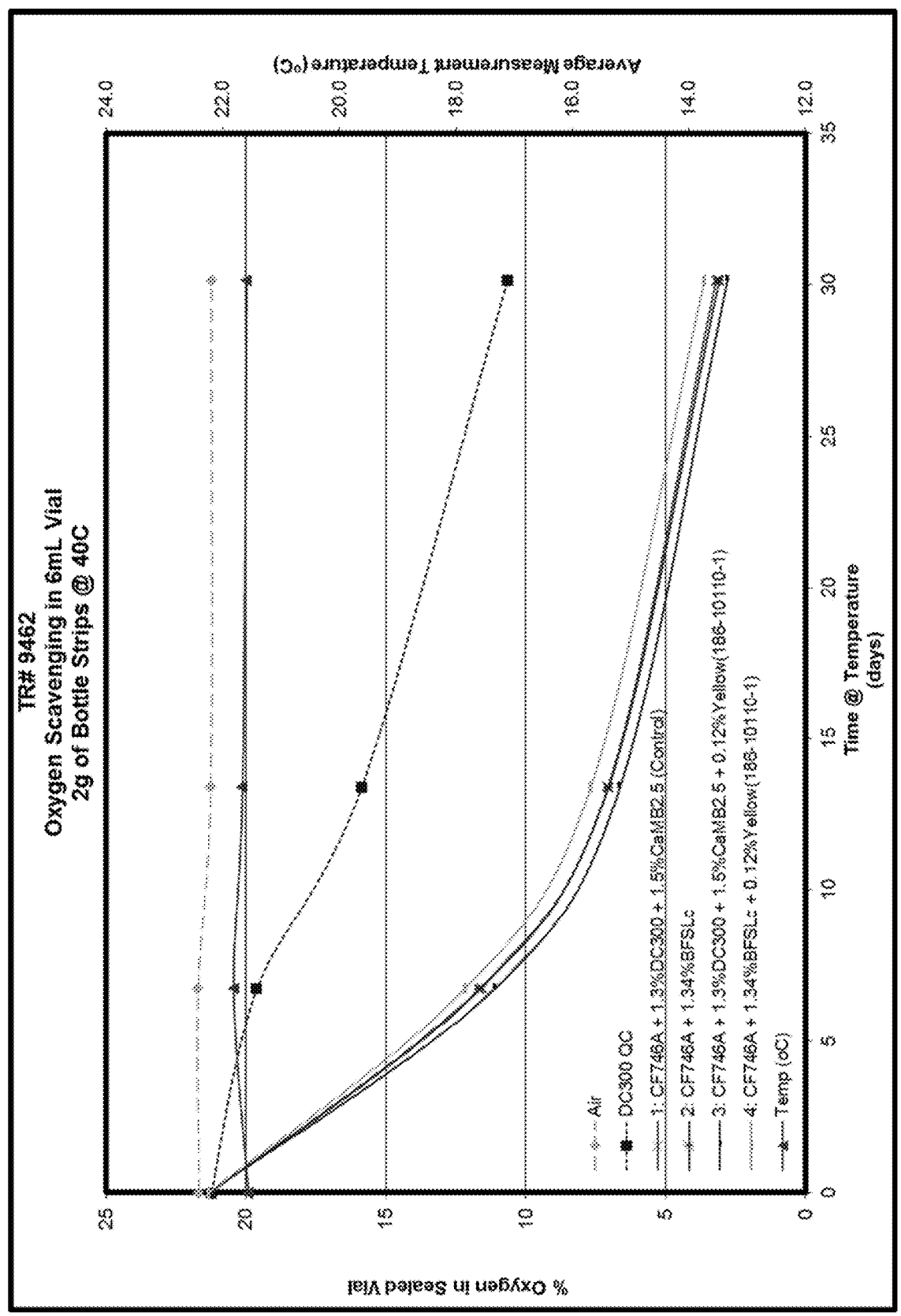
FIG. 2 is a graph illustrating oxygen scavenging performance of polymer compositions prepared using colorants and a representative oxygen scavenging master batch composition according to present invention.

As seen from the data of FIG. 2, the oxygen scavenging performance of the polymer compositions comprising the inventive oxygen scavenging master batch composition was comparable to the corresponding two-component systems at the equivalent let-down ratio. IlliOp™ testing was then performed on the samples to confirm the Oxysense™ data. Briefly, IlliOp™ testing detects the amount of oxygen permeated through the bottle wall in real time. The tests involves mounting the bottle onto a brass plate with glue so as to form a closed system, with the exception of an in-pipe with N2 carrier gas and an out-pipe that connects to a detector. As O2 permeates through the bottle wall, it is carried by the N2 flow to the detector, which records the values in real time for use in calculating ingress rate.

As shown in Table 3 below, the IlliOp™ data confirms the Oxysense™ data results.

TABLE 3

| Test No. | Sample Composition | Averaged O$_2$ Ingress Rate at Equilibrium [ppm/pkg/day] |
|---|---|---|
| 1 | CF746A + 1.3% DC300 + 1.5% CaMB2.5 (Control) | 0.0033 |
| 2 | CF746A + 1.34% BFSLc | 0.0019 |
| 3 | CF746A + 1.3% DC300 + 1.5% CaMB2.5 + 0.12% Yellow (Control) | 0.0003 |
| 4 | CF746A + 1.34% BFSLc + 0.12% Yellow | 0.0010 |

7. Example 7: Oxygen Scavenging Performance of Oxygen Scavenging Master Batch Composition in DAK CF746A Resin with UV Inhibitor Bottle strips formed using DAK CF746A resin, UV inhibitor, and 1.03% oxygen scavenging master batch composition (BFSLc10; 96.25% DC300, 3.75% CoNDA) produced as described herein or two-component system (DC-300; CaMB) were collected and tested for oxygen scavenging ability using Oxysense™. The bottle strips were placed in a sealed glass vial, with a photoluminescent window on the wall. The intensity of light reflected from the photoluminescent window is proportional to the oxygen content in the vial. The Oxysense™ data for the above polymer compositions at various let-down ratios and a control composition (DC-300) comprised of Constar International's DC300 are shown in FIG. 3. 1.03% LDR Blue Diamond contains the same amount of DC300 as 1.0% LDR DC300.

Figure 3:
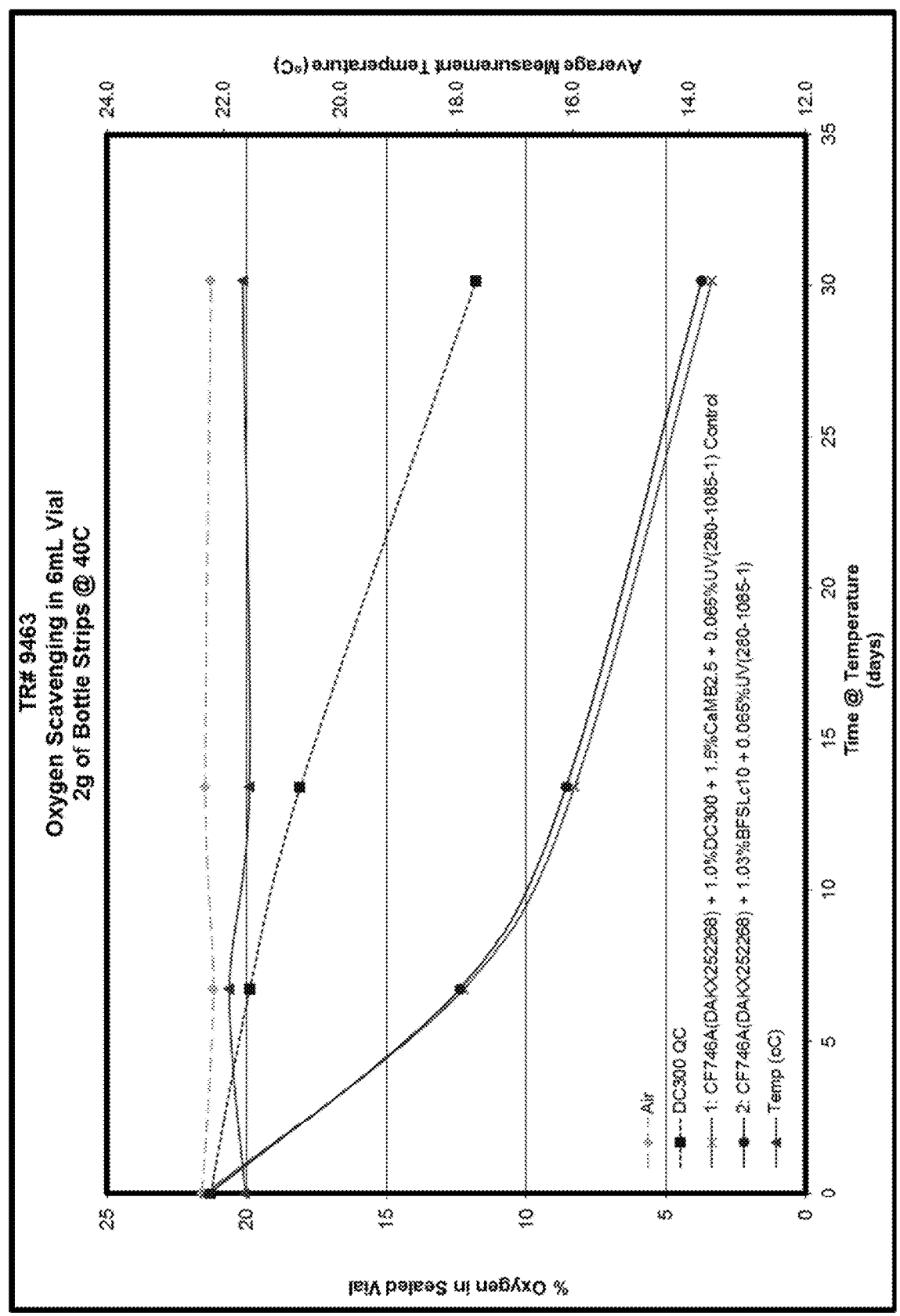
FIG. 3 is a graph illustrating oxygen scavenging performance of polymer compositions prepared using UV-inhinbtor additive and a representative oxygen scavenging master batch composition according to present invention.

As seen from the data of FIG. 3, the oxygen scavenging performance of the inventive polymer composition was comparable to the corresponding two-component system at the equivalent let-down ratio. These result were confirmed with IlliOp™ data as shown in Table 4 below.

TABLE 4

| Test No. | Sample Composition | Averaged O$_2$ Ingress Rate at Equilibrium [ppm/pkg/day] |
|---|---|---|
| 1 | CF746A + 1.0% DC300 + 1.5% CaMB2.5 + 0.065% UV(280-1085-1) (Control) | 0.0007 |
| 2 | CF746A + 1.03% BFSLc10 + 0.065% UV(280-1085-1) | 0.0008 |

8. Example 8: Oxygen Scavenging Performance of Oxygen Scavenging Master Batch Composition in DAK Parastar 7000 Resin Bottle strips formed using DAK ParaStar 7000 resin and 1.24% oxygen scavenging master batch composition (BFSL12; 96.86% DC-300, 3.14% CoNDA) produced as described herein or two-component system (DC-300; CaMB) were collected and tested for oxygen scavenging ability using Oxysense™. The bottle strips were placed in a sealed glass vial, with a photoluminescent window on the wall. The intensity of light reflected from the photoluminescent window is proportional to the oxygen content in the vial. The Oxysense™ data for the above polymer compositions at various let-down ratios and a control composition (DC-300) comprised of Constar International's DC300 are shown in FIG. 4. 1.24% LDR Blue Diamond contains the same amount of DC300 as 1.2% LDR DC300.

Figure 4:
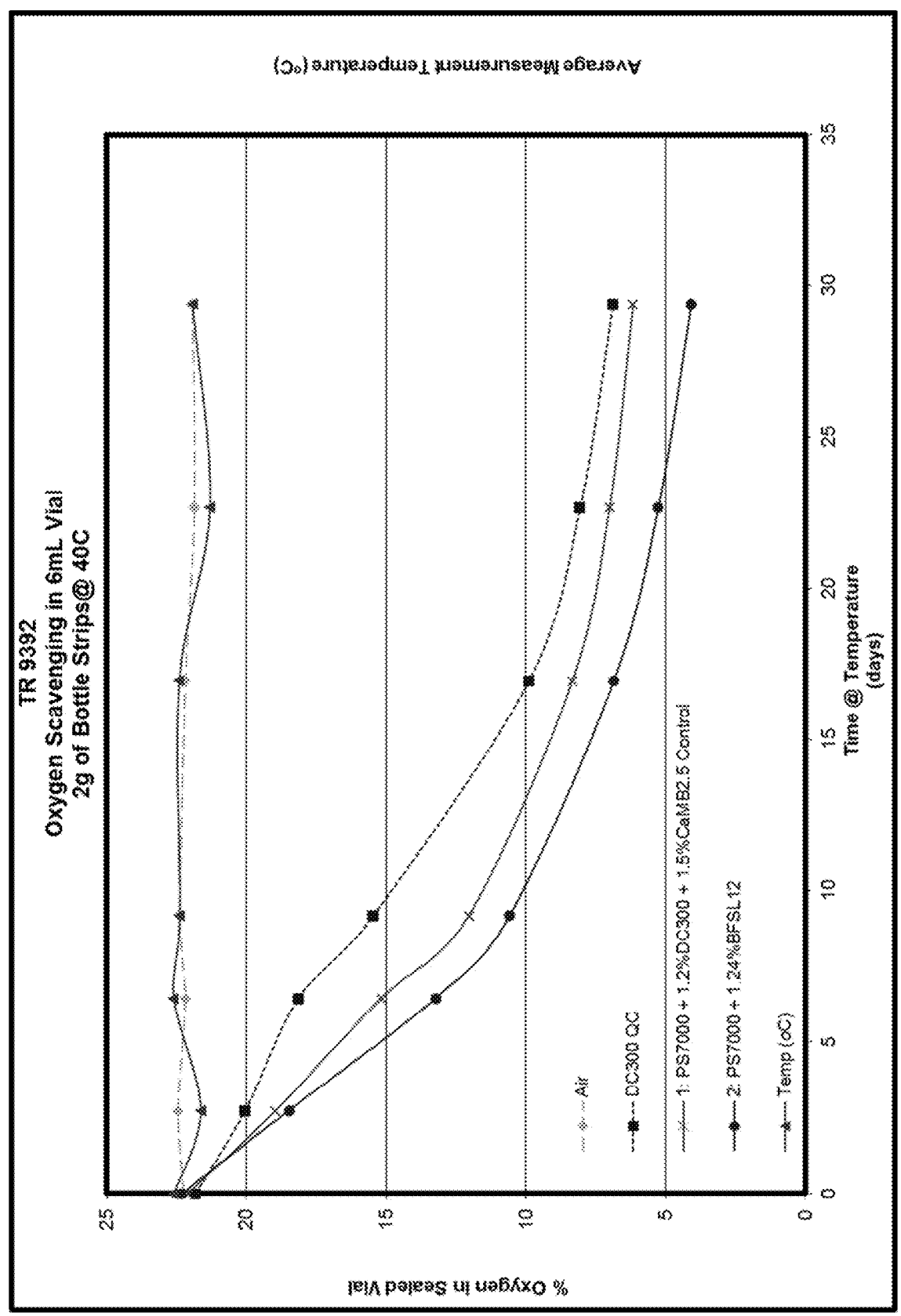
FIG. 4 is a graph illustrating oxygen scavenging performance of polymer compositions prepared using a representative oxygen scavenging master batch composition according to present invention.

As seen from the data of FIG. 4, the oxygen scavenging performance of the inventive polymer composition was comparable to the corresponding two-component system at the equivalent let-down ratio. These result were confirmed with IlliOp™ data as shown in Table 5 below.

TABLE 5

| Test No. | Sample Composition | Averaged O$_2$ Ingress Rate at Equilibrium [ppm/pkg/day] |
|---|---|---|
| 1 | PS7000 + 1.2% DC300 + 1.5% CaMB2.5 (Control) | 0.0071 |
| 2 | PS7000 + 1.24% BFSL12 | 0.0011 |

9. Example 9: Color and Hotfill Performance of Oxygen Scavenging Master Batch Composition in Parastar™ 9000

Figure 5:
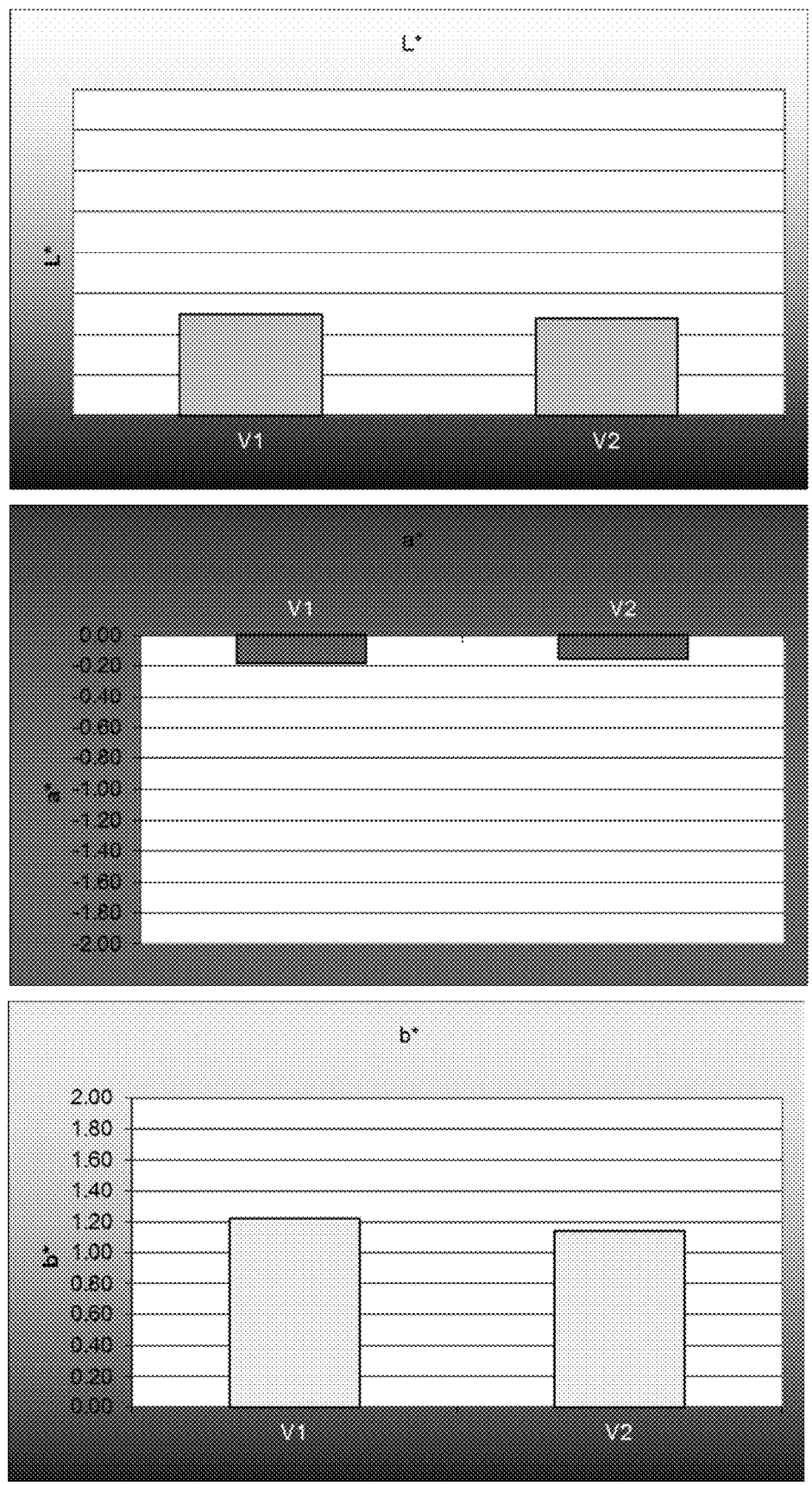
FIG. 5 is a graph illustrating color performance of a polymer composition prepared using a representative oxygen scavenging master batch composition according to present invention.

Bottles formed using ParaStar™ 9000 resin and either, the inventive oxygen scavenging master batch composition produced as described herein, or two-component system The bottles were tested for color and bottle structure integrity during hot-filling operation. As the data show in FIG. 5, the color performance of the polymer composition comprising the inventive oxygen scavenging master batch composition (V2) was comparable to the color performance of control polymer compositions comprising the two component oxygen scavenging system (V1). The hotfill performance for the two formulations was also found to be comparable.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An oxygen scavenging master batch composition consisting of:
   (a) one or more transition metal compounds; and
   (b) one or more oxygen scavenger compounds having a structure selected from

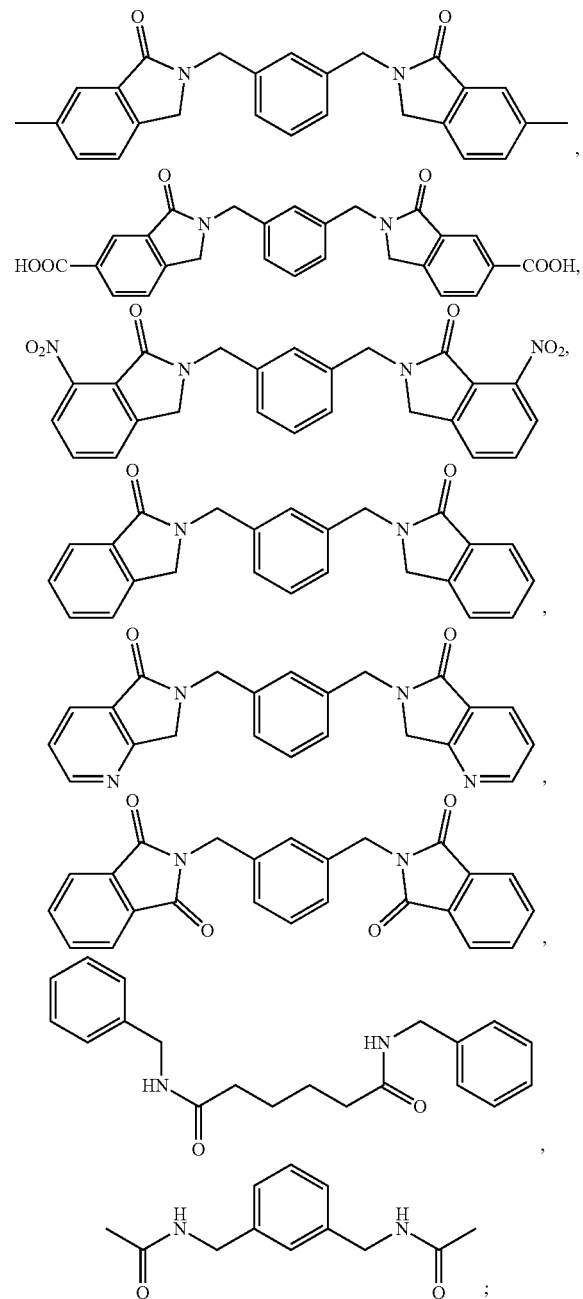

wherein the one or more transition metal compounds is present in an amount greater than about 500 ppm (by metal) based on the total weight of the oxygen scavenging master batch composition.

2. The composition of claim 1, wherein the one or more transition metal compounds comprises cobalt.

3. The composition of claim 2, wherein the one or more transition metal compounds is a cobalt carboxylate, a cobalt neodecanoate, or a combination thereof.

4. The composition of claim 1, wherein the one or more oxygen scavenger compounds is present in a weight percent amount of about 50% to about 90% based on the total weight of the oxygen scavenging master batch composition.

5. An article of manufacture comprising the composition of claim 1.

6. A method of making an oxygen scavenging master batch composition comprising the step of combining:
   (a) one or more transition metal compounds; and
   (b) one or more oxygen scavenger compounds having a structure selected from

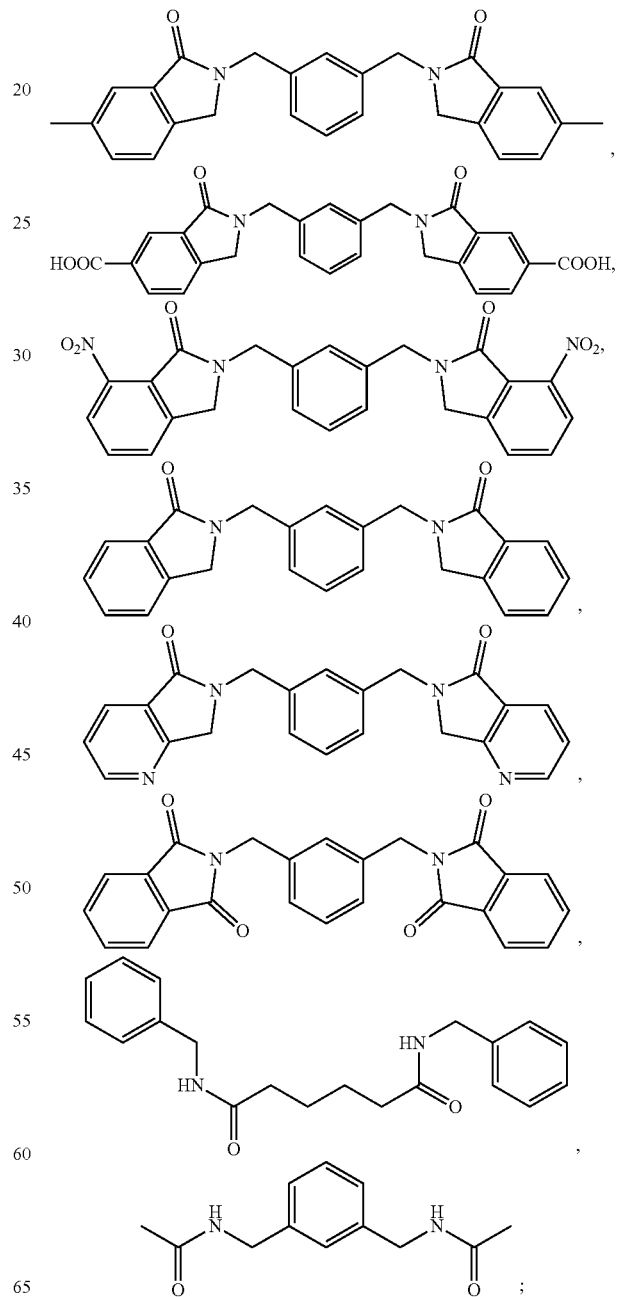

under conditions effective to provide an oxygen scavenging master batch composition;

wherein the one or more transition metal compounds is present in an amount greater than about 500 ppm (by metal) weight percent based on the total weight of the oxygen scavenging master batch composition, wherein the oxygen scavenging master batch composition consists of the one or more transition metal compounds and the one or more oxygen scavenger compounds.

7. The method of claim 6, wherein the one or more transition metal compounds comprises cobalt.

8. The method of claim 6, wherein the one or more transition metal compounds is a cobalt carboxylate, a cobalt neodecanoate, or a combination thereof.

9. The method of claim 6, wherein the conditions effective to provide comprise blending or compacting the components, and extruding the composition.

10. The method of claim 6, wherein the conditions effective to provide comprise melt blending the components.

11. The method of claim 9, wherein the extruding is in the absence of a binder.

12. The method of claim 6, wherein the one or more oxygen scavenger compounds is present in a weight percent amount of about 50% to about 90% based on the total weight of the oxygen scavenging master batch composition.

* * * * *